(12) United States Patent
Komatsu et al.

(10) Patent No.: US 11,200,882 B2
(45) Date of Patent: Dec. 14, 2021

(54) SIGNAL PROCESSING DEVICE, SIGNAL PROCESSING METHOD, AND STORAGE MEDIUM FOR STORING PROGRAM

(71) Applicant: NEC Corporation, Tokyo (JP)

(72) Inventors: Tatsuya Komatsu, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 71 days.

(21) Appl. No.: 16/625,897

(22) PCT Filed: Jul. 3, 2017

(86) PCT No.: PCT/JP2017/024330
§ 371 (c)(1),
(2) Date: Dec. 23, 2019

(87) PCT Pub. No.: WO2019/008625
PCT Pub. Date: Jan. 10, 2019

(65) Prior Publication Data
US 2020/0152171 A1   May 14, 2020

(51) Int. Cl.
*G10L 15/00* (2013.01)
*G10L 15/04* (2013.01)
*G10L 15/02* (2006.01)

(52) U.S. Cl.
CPC .................... *G10L 15/02* (2013.01)

(58) Field of Classification Search
CPC ...... G06K 9/624; G10L 15/02; G10L 21/0272
USPC ...................................................... 704/254
See application file for complete search history.

(56) References Cited

U.S. PATENT DOCUMENTS

| 7,369,991 | B2* | 5/2008 | Manabe | G06K 9/00335 |
| | | | | 704/235 |
| 8,570,291 | B2* | 10/2013 | Motomura | G06F 3/016 |
| | | | | 345/173 |
| 2007/0010972 | A1* | 1/2007 | Praskovsky | G01S 13/87 |
| | | | | 702/189 |

(Continued)

FOREIGN PATENT DOCUMENTS

JP   2012-163918 A   8/2012

OTHER PUBLICATIONS

International Search Report in International Application No. PCT/JP2017/024330, dated Aug. 22, 2017.

(Continued)

*Primary Examiner* — Khai N. Nguyen
(74) *Attorney, Agent, or Firm* — Sughrue Mion, PLLC

(57) ABSTRACT

A signal processing device according to an exemplary aspect of the present invention includes: at least one memory storing a set of instructions; and at least one processor configured to execute the set of instructions to: extract, from a target signal, a feature value representing a feature of the target signal; calculate, based on the extracted feature value, signal element bases capable of representing a plurality of object signals by linear combination, and information of the linear combination, weights each representing intensities of the plurality of object signals included in the target signal; derive, based on the weights, information of a target object signal included in the target signal, the target object signal being at least one type of the plurality of object signals; and output information of the target object signal.

18 Claims, 14 Drawing Sheets

(56) References Cited

U.S. PATENT DOCUMENTS

| | | | | |
|---|---|---|---|---|
| 2007/0080965 | A1* | 4/2007 | Kondo | G06K 9/4609 |
| | | | | 345/441 |
| 2010/0094631 | A1* | 4/2010 | Engdegard | G10L 19/008 |
| | | | | 704/258 |
| 2015/0348564 | A1* | 12/2015 | Paulus | H03G 3/20 |
| | | | | 704/500 |
| 2016/0273921 | A1* | 9/2016 | Zhou | G01C 21/165 |
| 2018/0081052 | A1* | 3/2018 | Sakamaki | G01S 7/415 |
| 2018/0190284 | A1* | 7/2018 | Singh | G10L 15/22 |
| 2019/0174246 | A1* | 6/2019 | De Bruijn | H04R 3/12 |
| 2020/0152171 | A1* | 5/2020 | Komatsu | G10L 21/0272 |

OTHER PUBLICATIONS

Written Opinion in International Application No. PCT/JP2017/024330, dated Aug. 22, 2017.

Dennis L. Sun, et al., "Universal speech models for speaker independent single channel source separation", 2013 IEEE International Conference on Acoustics, Speech and Signal Processing (ICASSP) (5 pages total).

Hiroaki Nakajima, et al., "Analysis on Degree of Freedom for Supervised NMF with All-pole-model-based Basis Deformation", The Institute of Electronics, Information and Communication Engineers, IEICE Technical Report, Dec. 4, 2015, vol. 115, No. 359, pp. 13-18 (6 pages total).

Hirokazu Kameoka, "Non-negative Matrix Factorization", Journal of the Society of Instrument and Control Engineers, Sep. 10, 2012, vol. 51, No. 9, pp. 835-844 (10 pages total).

Hiroshi Sawada, "Nonnegative Matrix Factorization and Its Applications to Data/Signal Analysis", IEICE Technical Report, The Institute of Electronics, Information and Communication Engineers, Sep. 1, 2012, vol. 95, No. 9, pp. 829-833 (5 pages total).

* cited by examiner

SIGNAL PROCESSING DEVICE, SIGNAL PROCESSING METHOD, AND STORAGE MEDIUM FOR STORING PROGRAM

This application is a National Stage Entry of PCT/JP2017/024330 filed on Jul. 3, 2017, the contents of all of which are incorporated herein by reference, in their entirety.

TECHNICAL FIELD

The present invention relates to a technique for processing a signal.

BACKGROUND ART

In the following description, separating a signal represents separating, from a signal in which signals from a plurality of signal sources are mixed, a signal from a predetermined type of signal source. The signal source is, for example, hardware that generates a signal. A separated signal is referred to as an object signal. The object signal is a signal from the predetermined type of signal source described above. A signal source that generates an object signal is referred to as an object signal source. The object signal source is the predetermined type of signal source described above. A signal from which an object signal is separated is also referred to as a detection target signal. The detection target signal is a signal in which signals from the plurality of signal sources described above are mixed. A component corresponding to a signal from an object signal source among components of a detection target signal is referred to as a component of an object signal. The component of an object signal is also referred to as an object signal component, and an object signal source component.

NPL 1 discloses one example of a technique for separating a signal. In the technique of NPL 1, a feature value of a component of an object signal to be separated is previously modeled and held as a basis. In the technique of NPL 1, an input signal in which components of a plurality of object signals are mixed is decomposed, by using held bases, into bases and weights of components of the plurality of object signals.

CITATION LIST

Non Patent Literature

[NPL 1] Dennis L. Sun and Gautama J. Mysore, "Universal speech models for speaker independent single channel source separation," 2013 IEEE International Conference on Acoustics, Speech and Signal Processing (ICASSP), pp. 141 to 145, 2013

SUMMARY OF INVENTION

Technical Problem

As described above, the object signal source is a predetermined type of signal source. The object signal source may not necessarily be one signal source. For example, a plurality of different signal sources of a predetermined type may be an object signal source. Object signals may be signals generated by the same signal source. The object signal may be a signal generated by any of a plurality of different signal sources of a predetermined type. The object signal may be a signal generated by one signal source of a predetermined type. Even in a signal from the same signal source, a fluctuation exists in the signal. Even in signals generated by signal sources of the same type, variations are generated in the signals, for example, depending on an individual difference of the signal sources.

Therefore, in a component of the same object signal, a fluctuation and variations exist. In the technique of NPL 1, when a fluctuation is large, it is not possible to accurately separate an object signal by using the same basis, even when the object signal is from the same object signal source. It is also not possible to accurately separate an object signal by using the same basis, even when the object signals are from object signal sources of the same type, when, for example, variations of an object signals exist due to a variation of the object signal sources. When a fluctuation exists, it is necessary to hold different bases for a object signal that varies due to the fluctuation. When variations exist, it is necessary to hold different bases for the variations of an object signal. Therefore, when an object signal is modeled as a basis, the number of bases is increased according to a magnitude of a fluctuation and the number of variations. Therefore, in order to model various actual object signal sources as bases, it is necessary to hold an enormous number of bases. Therefore, an enormous memory cost is required.

An object of the present invention is to provide a signal processing technique capable of acquiring information of an object signal component that is modeled at a low memory cost even when a variation of object signals is large.

Solution to Problem

A signal processing device according to an exemplary aspect of the present invention includes: feature extraction means for extracting, from a target signal, a feature value representing a feature of the target signal; analysis means for calculating, based on the extracted feature value, signal element bases capable of representing a plurality of types of object signals by linear combination, and information of the linear combination, weights each representing intensities of the plurality of object signals included in the target signal; processing means for deriving, based on the weights, information of a target object signal included in the target signal, the target object signal being at least one type of the object signals; and output means for outputting information of the target object signal.

A signal processing method according to an exemplary aspect of the present invention includes: extracting, from a target signal, a feature value representing a feature of the target signal; calculating, based on the extracted feature value, signal element bases capable of representing a plurality of types of object signals by linear combination, and information of the linear combination, weights each representing intensities of the plurality of object signals included in the target signal; deriving, based on the weights, information of a target object signal included in the target signal, the target object signal being at least one type of the object signals; and outputting information of the target object signal.

A storage medium according to an exemplary aspect of the present invention stores a program causing a computer to execute: feature extraction processing of extracting, from a target signal, a feature value representing a feature of the target signal; analysis processing of calculating, based on the extracted feature value, signal element bases capable of representing a plurality of types of object signals by linear combination, and information of the linear combination, weights each representing intensities of the plurality of object signals included in the target signal; derivation processing of deriving, based on the weights, information of a target object signal included in the target signal, the target object signal being at least one type of the object signals; and output processing of outputting information of the target object signal.

Advantageous Effects of Invention

The present invention produces an advantageous effect that, even when a variation of object signals is large, information of a component of a modeled object signal can be acquired at a low memory cost.

EXAMPLE EMBODIMENT

Related Art

Before example embodiments of the present invention are described, a technique for separating a signal that is a related art for both a technique according to the example embodiments of the present invention and the technique described in NPL 1 is described.

Figure 14:
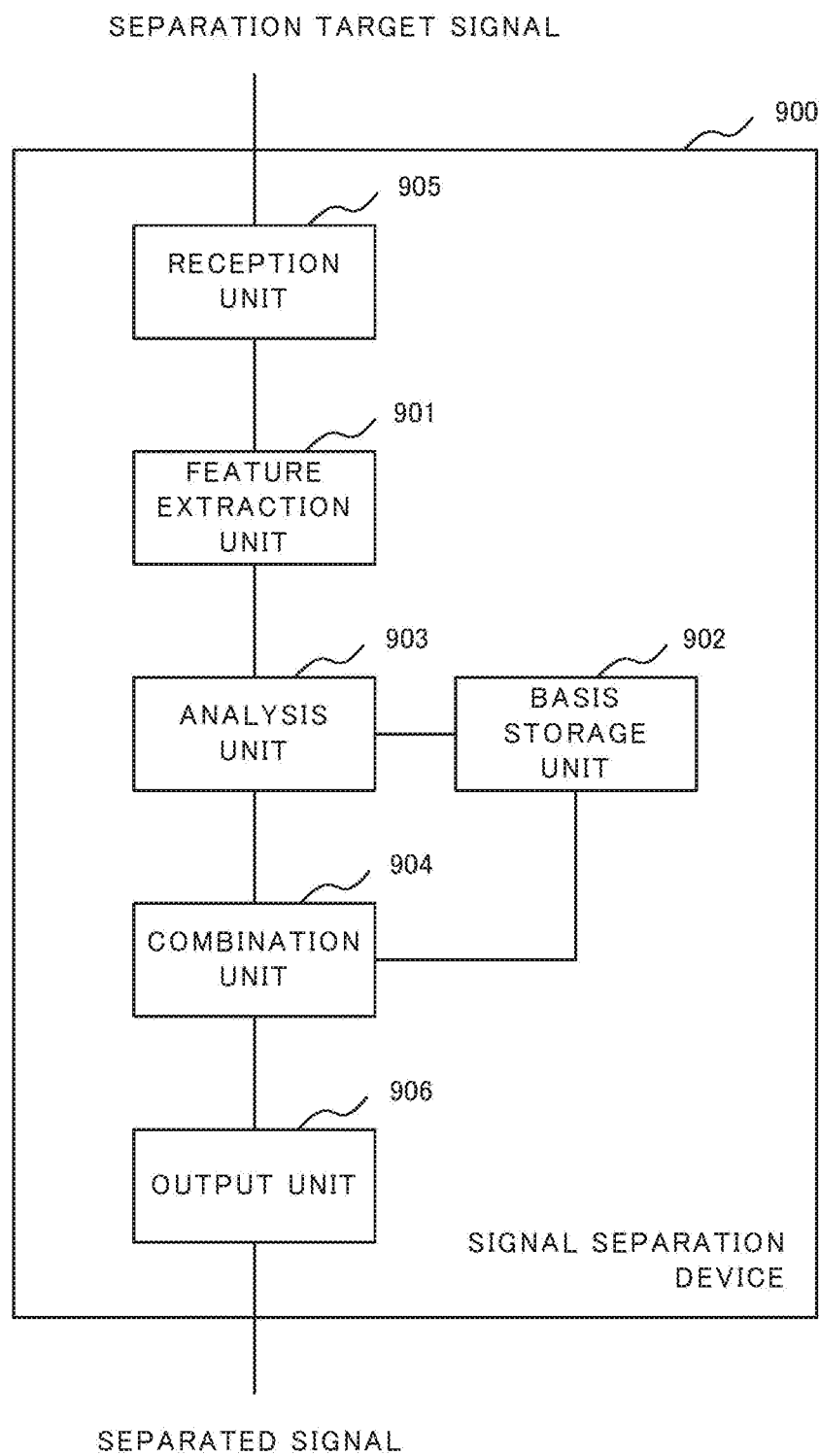
FIG. 14 is a block diagram illustrating an example of a configuration of a signal separation device implemented by a related art.

FIG. 14 is a block diagram illustrating an example of a configuration of a signal separation device 900 implemented based on the related art. The signal separation device 900 includes a feature extraction unit 901, a basis storage unit 902, an analysis unit 903, a combination unit 904, a reception unit 905, and an output unit 906.

The reception unit 905 receives a separation target signal including, as a component, an object signal from an object signal source. A separation target signal is, for example, a signal measured by a sensor.

The feature extraction unit 901 receives, as input, a separation target signal, extracts a feature value from the received separation target signal, and transmits the extracted feature value to the analysis unit 903.

The basis storage unit 902 stores a feature value basis of an object signal source. The basis storage unit 902 may store a feature value basis of each of a plurality of object signals.

The analysis unit 903 receives, as input, a feature value transmitted from the feature extraction unit 901, and reads a feature value basis stored in the basis storage unit 902. The analysis unit 903 calculates an intensity (i.e. a weight) of a feature value basis of an object signal in the received feature value. The analysis unit 903 may calculate, in the received feature value, an intensity (i.e. a weight) of each feature value basis for each object signals. The analysis unit 903 transmits the calculated weight, for example, to the combination unit 904, for example, in a form of a weight matrix.

The combination unit 904 receives a weight, for example, in a form of a weight matrix from the analysis unit 903. The combination unit 904 reads a feature value basis stored in the basis storage unit 902. The combination unit 904 generates a separated signal on the basis of a weight received from the analysis unit 903, for example, in a form of a weight matrix, and a feature value basis stored in the basis storage unit 902. Specifically, the combination unit 904 calculates a series of feature values of the object signal by, for example, linearly combining weights and feature value bases. The combination unit 904 generates, from the acquired series of feature values of the object signal, a separated signal of the object signal and transmits the generated separated signal to the output unit 906. When extraction of a feature value from a signal by the feature extraction unit 901 is equivalent to application of a predetermined conversion to the signal as in an example described below, the combination unit 904 may generate a separated signal by applying inverse conversion of the predetermined conversion to a series of feature values of an object signal.

The output unit 906 receives a separated signal from the combination unit 904, and outputs the received separated signal.

In an example of the following description, a type of a signal generated by a signal source is an acoustic signal. In the following description, a separation target signal is an acoustic signal $x(t)$. Here, $t$ is an index representing a time. Specifically, $t$ is a time index of an acoustic signal sequentially input, and a certain time (e.g. a time at which input to a device is performed) is designated as the origin $t=0$. And $x(t)$ is a series of digital signals acquired by applying analog to digital (AD) conversion to an analog signal recorded by a sensor such as a microphone or the like. In an acoustic signal recorded by a microphone installed in an actual environment, components generated from various sound sources in the actual environment are mixed. When, for example, an acoustic signal is recorded by a microphone installed in an office, a signal in which various components of acoustics (e.g. a conversational voice, a keyboard sound, an air-conditional sound, and a footstep) from various sound sources existing in the office are mixed is recoded by the microphone. A signal acquirable via observation is an acoustic signal x(t) representing an acoustic in which acoustics from various sound sources are mixed. A sound source generating an acoustic included in an acoustic signal as which signals from sound sources are acquired is unknown. Intensities of acoustics from individual sound sources included in sound sources from which the acoustics are acquired are unknown. In the related art, an acoustic signal representing an acoustic that comes from a sound source and may be mixed into an acoustic signal recorded in an actual environment is modeled in advance as an object acoustic signal (i.e. the above-described object signal) by using a basis of a feature value component. The signal separation device 900 receives an acoustic signal x(t), separates the received acoustic signal into components of object acoustics included in the acoustic signal, and outputs the separated components of the object acoustics.

The feature extraction unit 901 receives, as input, for example, x(t) having a predetermined time width (e.g. two seconds in a case where a signal is an acoustic signal). The feature extraction unit 901 calculates, based on the received x(t), for example, a feature value matrix Y=[y(1), . . . ,y(L)] that is a K×L matrix as a feature value, and outputs the calculated Y. A feature value is exemplarily described later. A vector y(j) (j=1, . . . ,L) is a vector representing a K-dimensional feature value in a time frame j that is a j-th time frame. A value of K may be determined in advance. L is the number of time frames of the received x(t). A time frame is a signal having a length of a unit time width (i.e. interval) in which a feature value vector y(j) is extracted from x(t). When, for example, x(t) is an acoustic signal, an interval is generally defined as approximately 10 milliseconds (ms). When j is defined as, for example, j=1 for t=0 as a base, a relation between j and t is: t=10 ms for j=2, and t=20 ms for j=3, . . . . A vector y(j) is a feature value vector of x(t) of a time t related to a time frame j. A value of L is the number of time frames included in a signal x(t). When a unit of a time width of a time frame is defined as 10 ms and x(t) having a length of 2 seconds is received, L is 200. When a signal x(t) is an acoustic signal, an amplitude spectrum acquired by applying short-time Fourier transform to x(t) is frequently used as a feature value vector y(j). In another example, a logarithmic frequency amplitude spectrum acquired by applying wavelet transform to x(t) may be used as a feature value vector y(j).

The basis storage unit 902 stores a feature value of an object signal, for example, as a feature value basis matrix in which a feature value basis of an object signal is represented by a matrix. When the number of feature value bases of an object signal source is S, a feature value basis matrix, which is a matrix representing S feature value bases of the object signal source, is described as W=[W_1, . . . ,W_S]. The basis storage unit 902 may store, for example, a feature value basis matrix W. A matrix W_s (s=1, . . . ,S) is a K×n(s) matrix in which feature value bases of an object signal source s that is an s-th object signal source. Here, n(s) represents the number of feature value bases of an object signal source s. A case where a signal is an acoustic, an object signal source (i.e. an object sound source) is a piano, and an object signal is a sound of a piano is described as a simple example for simplification. When seven sounds that are Doe, Ray, Me, Far, Sew, La, and Tea generated by a specific piano A are modeled as object signals (i.e. object acoustics) from an object sound source that is a "piano A", the number of feature value bases n(piano A) is described as n(piano A)=7. A feature value basis matrix W_(piano A) is a K×7 matrix W_(piano_A)=[w_(Doe), . . . ,w_(Tea)] in which feature value vectors of sounds are combined.

The analysis unit 903 decomposes a feature value matrix Y output by the feature extraction unit 901 into a product Y=WH of a feature value basis matrix W stored in the basis storage unit 902 and a weight matrix H having R rows and L columns, and outputs the acquired weight matrix H.

Here, R is a parameter representing the number of columns of W and is a sum of n(s) with respect to every s={1, . . . ,S}. H represents weights indicating to what extent bases of W are included in a component y(j) of Y in each of the frames (i.e. from 1 to L). When a vector in a j-th column of H is referred to as h(j), h(j) is described as h(j)=[h_1(j)$^T$, . . . ,h_S(j)$^T$]$^T$. Here, h_s(j) (s=1, . . . ,S) is an n(s)-dimensional vertical vector representing weights of feature value bases W_s of an object sound source s in a time frame j. T represents transposition of a vector and a matrix. The analysis unit 903 may calculate a weight matrix H by using a well-known matrix decomposition method, such as independent component analysis (ICA), principal component analysis (PCA), non-negative matrix factorization (NMF), or sparse coding. In an example described below, the analysis unit 903 calculates a weight matrix H by using NMF.

The combination unit 904 generates a series of feature values by linearly combining weights and feature value bases with respect to each object sound source by using a weight matrix H output by the analysis unit 903 and a feature value basis matrix W, stored in the basis storage unit 902, of sound sources. The combination unit 904 converts the generated series of feature values, and thereby generates a separated signal x_s(t) of a component of an object sound source s with respect to s={1, . . . ,S}. The combination unit 904 outputs the generated separated signal x_s(t). For example, a product Y_s=W_s·H_s is a product of feature value bases W_s of an object sound source s and H_s=[h_s(1), . . . ,h_s(L)]. W_s is included in a feature value basis matrix W and relates to the object sound s. H_s=[h_s(1), . . . ,h_s(L)] is weights of the feature value bases of the object sound source s and is included in a weight matrix H, It is conceivable that the product Y_s=W_s·H_s is a series of feature values of components of a signal representing an acoustic from the object sound source s in an input signal x(t). In the following, a component of a signal representing an acoustic from an object sound source s is also simply referred to as a component of an object sound source s. A component x_s(t) of an object sound source s, included in an input signal x(t), is acquired by applying, to Y_s, inverse conversion (e.g. inverse Fourier transform in a case of short-time Fourier transform) of feature value conversion used for calculating a feature value matrix Y by the feature extraction unit 901.

The above indicates the related art. In the above-described example, a specific piano A is designated as an object sound source and as feature values of the specific piano A, W_(piano A) is defined. However, in actuality, a sound of a piano has an individual difference. Therefore, in order to more accurately separate an object signal by using the above-described method in a case where a "sound of a piano" is an object sound source, it is necessary to hold a feature value basis matrix W including feature value vectors of sounds of various individual pianos. In order to more accurately separate an object signal by using the above-described method in cases where an object sound source is more general as in a case of a "footstep" or a "breaking sound of glass", it is necessary to hold feature value vectors for enormous variations of a footstep or a breaking sound of glass. In these cases, a feature value basis matrix W_(footstep) and a feature value basis matrix W_(breaking sound of glass) are matrices having an enormous number of columns. Therefore, an enormous memory cost is required in order to hold a feature value basis matrix W. An object of example embodiments of the present invention described below is that, even when there are enormous variations of an object signal, a component of an object sound source is separated from a signal in which object signals are mixedly recorded, while reducing a required memory cost.

First Example Embodiment

Next, a first example embodiment of the present invention is described in detail with reference to drawings.

Configuration

Figure 1:
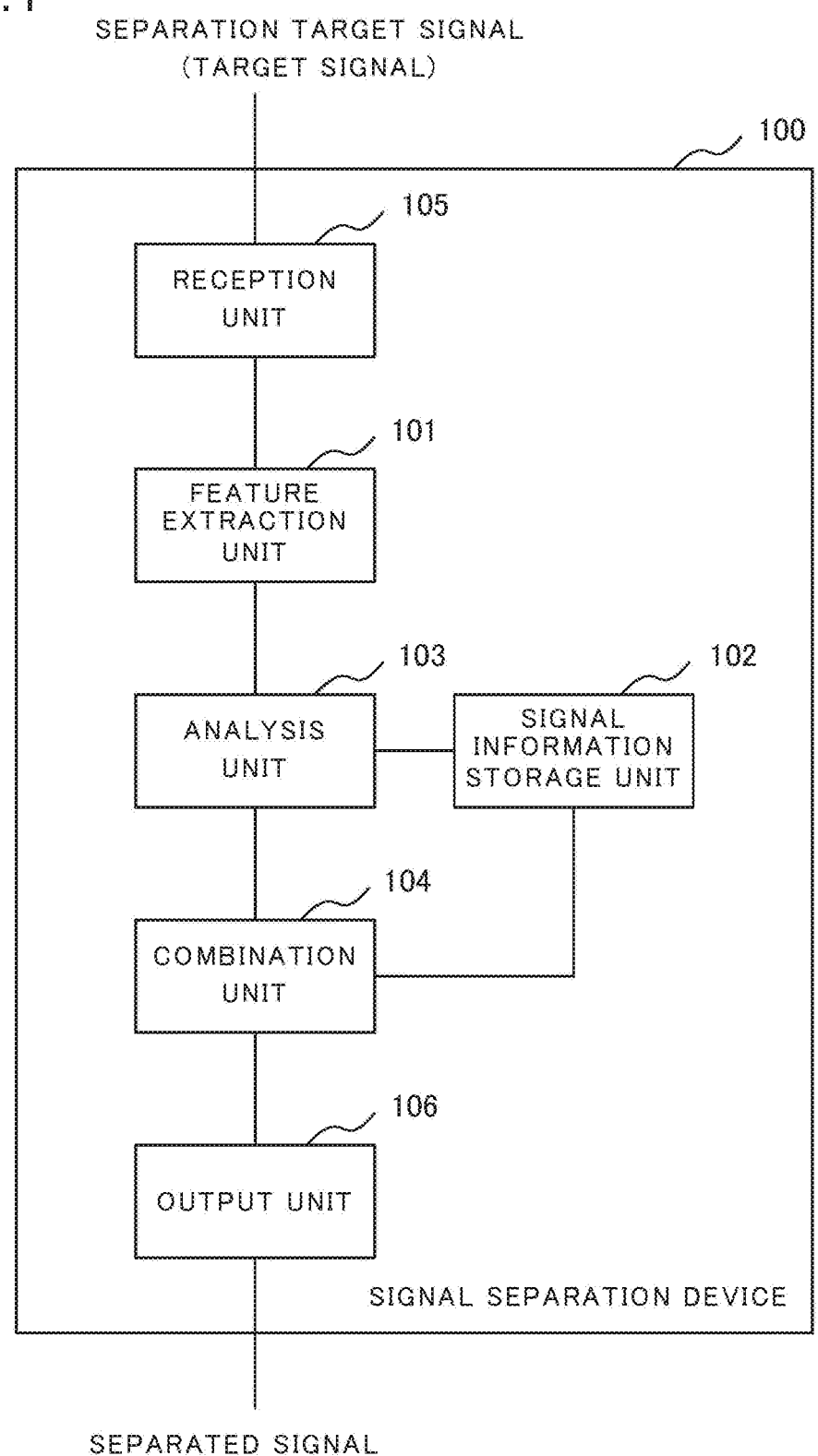
FIG. 1 is a block diagram illustrating an example of a configuration of a signal separation device according to a first example embodiment of the present invention.

FIG. 1 is a block diagram illustrating an example of a configuration of a signal separation device 100 according to the present example embodiment. The signal separation device 100 includes a feature extraction unit 101, a signal information storage unit 102, an analysis unit 103, a combination unit 104, a reception unit 105, and an output unit 106.

The reception unit 105 receives a separation target signal, for example, from a sensor. A separation target signal is a signal acquired by applying AD conversion to an analog signal acquired as a result of measurement by a sensor. A separation target signal may include an object signal from at least one object signal source. A separation target signal is simply referred to also as a target signal.

The feature extraction unit 101 receives, as input, a separation target signal and extracts a feature value from the received separation target signal. The feature extraction unit 101 transmits the feature value extracted from the separation target signal to the analysis unit 103. A feature value extracted by the feature extraction unit 101 may be the same as a feature value extracted by the feature extraction unit 901 described above. Specifically, when a separation target signal is an acoustic signal, the feature extraction unit 101 may extract, as a feature value, an amplitude spectrum acquired by applying short-time Fourier transform to a separation target signal. The feature extraction unit 101 may extract, as a feature value, a logarithmic frequency amplitude spectrum acquired by applying wavelet transform to a separation target signal.

The signal information storage unit 102 stores signal element bases in each of which an element that is a base of an object signal is modeled, and combination information indicating a combination manner of combining the signal element bases in such a way as to acquire a signal corresponding to the object signal. A signal element basis is, for example, a partial set linearly independent in a space established by feature values extracted from an object signal that is a target. An object signal that is a target is an object signal that is a target of processing. In the present example embodiment, an object signal that is a target is specifically an object signal that is a target of separation. In other example embodiments, an object signal that is a target may be an object signal that is a target of detection. Signal element bases are capable of being used for expressing, by linear combination, all feature values extracted from an object signal that is a target. A signal element basis may be represented, for example, by a vector. In this case, combination information may be represented, for example, by a combination coefficient of each signal element basis. A signal element basis is described in detail later. The signal information storage unit 102 may store, in a form of a matrix, signal element bases and combination information of each of a plurality of object signals. In other words, the signal information storage unit 102 may store a signal element basis matrix representing signal element bases in each of which an element that is a base of a plurality of object signals is modeled. The signal information storage unit 102 may further store, for each object signal, a combination matrix representing a combination manner of combining signal element bases in such a way as to generate a signal corresponding to an object signal. In this case, a signal element basis matrix and a combination matrix may be set in such a way that a matrix representing feature values of a plurality of object signals is generated by multiplying the signal element basis matrix and the combination matrix.

The analysis unit 103 receives a feature value transmitted from the feature extraction unit 101, and reads stored signal element bases and combination information (e.g. a signal element basis matrix and a combination matrix) from the signal information storage unit 102. The analysis unit 103 calculates, based on the received feature value and the read signal element bases and combination information, a weight representing a magnitude of contribution of an object signal in the received feature value. A method of calculating a weight is described in detail later. The analysis unit 103 transmits the calculated weight, for example, to the combination unit 104. The analysis unit 103 may generate, for example, a weight matrix representing a calculated weight, and transmit the generated weight matrix.

The combination unit 104 receives a weight transmitted, for example, as a weight matrix, and reads signal element bases and combination information stored, for example, as a signal element basis matrix and a combination matrix in the signal information storage unit 102. The combination unit 104 generates a separated signal of an object signal on the basis of a weight, signal element bases, and combination information. Specifically, the combination unit 104 generates a separated signal of an object signal, for example on the basis of a series of feature values of an object signal source acquired by combining signal element bases on the basis of a signal element basis matrix and a combination matrix. A method of generating a separated signal is described in detail later. The combination unit 104 transmits the generated separated signal to the output unit 106.

The output unit 106 receives the generated separated signal, and outputs the received separated signal.

Hereinafter, a specific example of processing by the signal separation device 100 is described in detail.

The feature extraction unit 101 extracts, similarly to the feature extraction unit 901 described above, a feature value from a separation target signal, and transmits the extracted feature value, for example, as a feature value matrix Y.

The signal information storage unit 102 stores a signal element basis matrix G representing signal element bases in which feature values of elements (referred to as signal elements) that are bases of a plurality of object signals, and a combination matrix C representing a combination manner of combining the signal element bases included in the signal element basis matrix G in such a way that a signal corresponding to an object signal is generated with respect to each of the plurality of object signals.

The analysis unit 103 receives, as input, a feature value matrix Y transmitted by the feature extraction unit 101, and reads a signal element basis matrix G stored in the signal information storage unit 102. The analysis unit 103 decomposes, by using the signal element basis matrix G and a combination matrix C, the feature value matrix Y in such a way that Y=GCH is satisfied, and transmits a matrix H acquired by the decomposition. Decomposition of a feature value matrix Y is described in detail in description of a third example embodiment described later.

A matrix H corresponds to a weight of each object signal in a feature value matrix Y. In other words, a matrix H is a weight matrix representing a weight of each object signal in a feature value matrix Y.

The combination unit 104 receives a weight matrix H transmitted by the analysis unit 103, and reads a signal element basis matrix G and a combination matrix C stored in the signal information storage unit 102. The combination unit 104 combines, by using the received weight matrix H and the read signal element basis matrix G and combination matrix C, components of an object signal with respect to each object sound source, and thereby generates a series of feature values of an object signal with respect to each object sound source. The combination unit 104 further applies, to a series of feature values, inverse conversion of conversion extracting a feature value from a signal, and thereby generates a separated signal x_s(t) in which a component of an object signal from an object sound source s is separated from a separation target signal. The combination unit 104 transmits the generated separated signal x_s(t) to the output unit 106. The combination unit 104 may transmit a feature value matrix Y_s instead of a separated signal x_s(t) of an object sound source s. The combination unit 104 does not need to output a separated signal x_s(t) of every s (i.e. every object sound source s whose signal element basis is stored). The combination unit 104 may output, for example, only a separated signal x_s(t) of an object sound source specified in advance.

Operation

Next, an operation of the signal separation device 100 according to the present example embodiment is described in detail with reference to a drawing.

Figure 2:
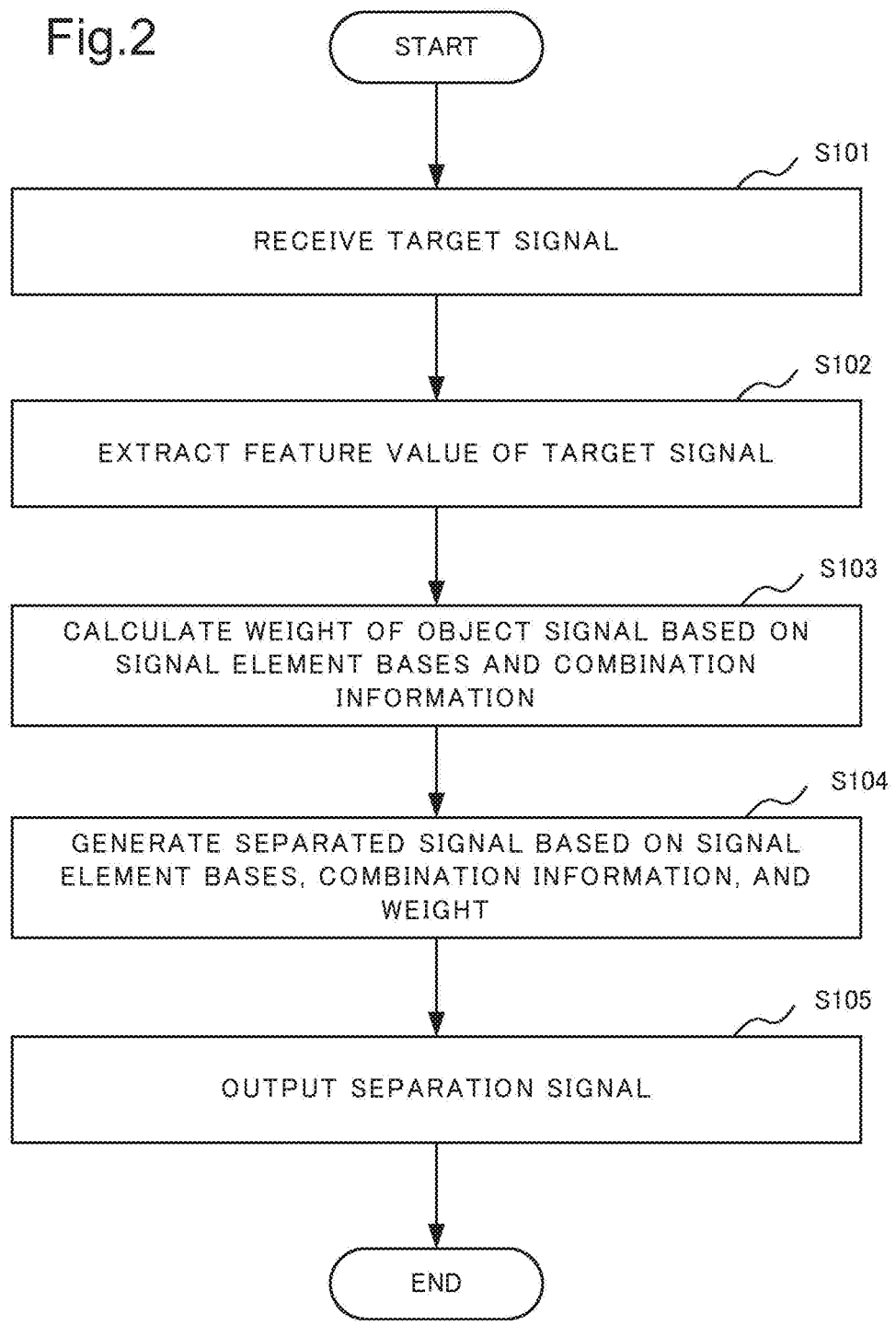
FIG. 2 is a flowchart illustrating an example of an operation of a signal separation device according to each of the first, a third, and a fifth example embodiments of the present invention.

FIG. 2 is a flowchart illustrating an example of an operation of the signal separation device 100 according to the present example embodiment. According to FIG. 2, first, the reception unit 105 receives a target signal (i.e. the above-described detection target signal) (step S101). The feature extraction unit 101 extracts a feature value of the target signal (step S102). The analysis unit 103 calculates a weight of an object signal in the target signal on the basis of the extracted feature value and a feature value basis stored in the signal information storage unit 102 (step S103). A weight of an object signal in a target signal represents, for example, an intensity of a component of an object signal included in a target signal. The combination unit 104 generates a separated signal on the basis of the feature value basis, combination information, and the weight (step S104). The output unit 106 outputs the generated separated signal (step S105).

Advantageous Effect

NPL 1 and the like use a method in which all variations of an object signal are modeled as feature value bases. In this method, a feature value basis matrix becomes larger as variations of an object signal increase, and therefore an enormous memory cost is required. In the present example embodiment, an object signal is modeled as a combination of signal element bases each of which is a basis of a finer unit for expressing all object signals that are targets of separation. Therefore, variations of an object signal are expressed as variations of a method of combining bases. Therefore, even when variations are increased, only a lower dimensional combination matrix may be increased instead of feature value bases themselves of an object signal. In the present example embodiment, a required memory cost is lower than a memory cost required in the technique of NPL 1. Therefore, according to the present example embodiment, a memory cost required for bases in which feature values of components of an object signal is modeled is low, and therefore a signal can be decomposed while a required memory cost is reduced.

Second Example Embodiment

Next, a second example embodiment of the present invention is described in detail with reference to a drawing.

Configuration

Figure 3:
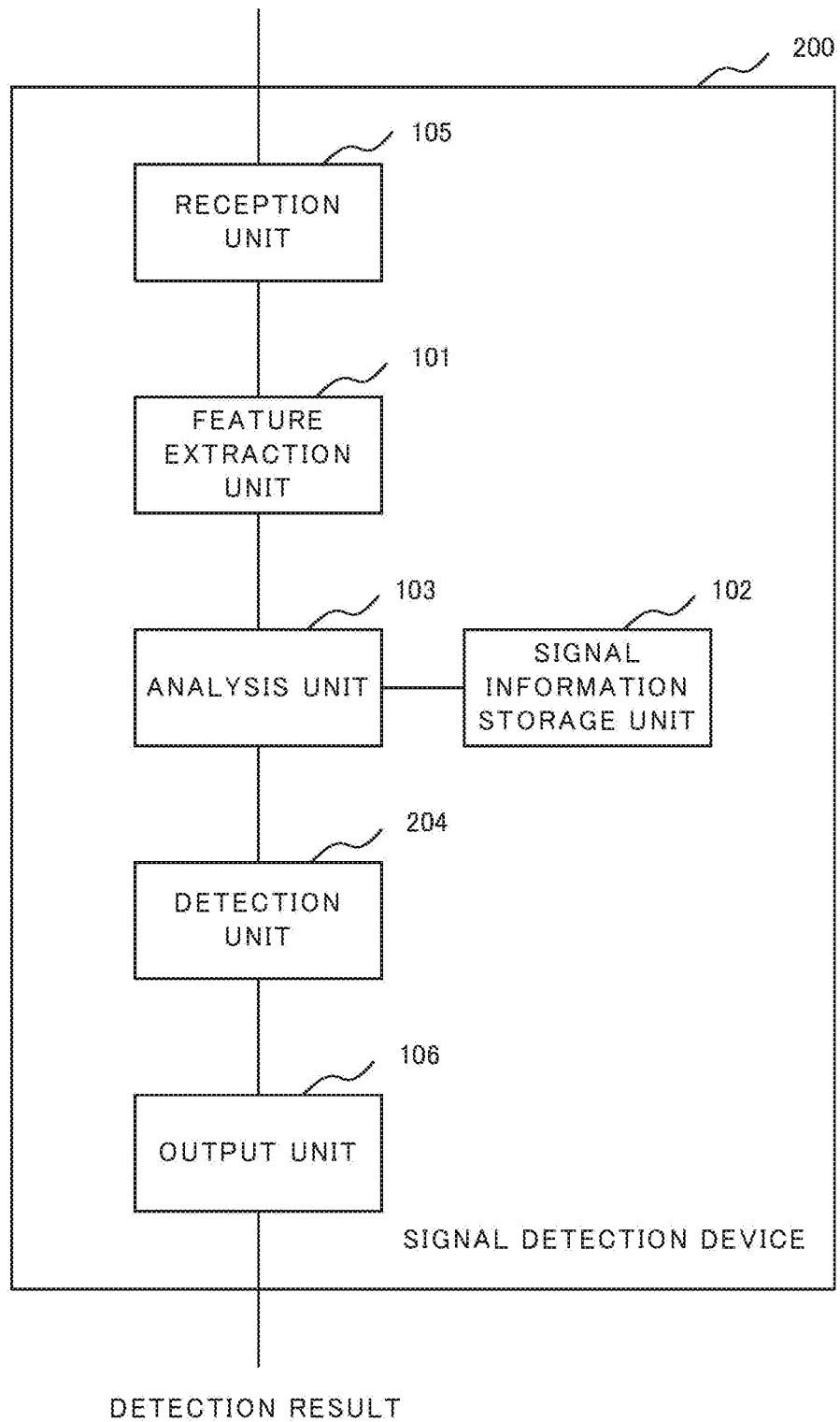
FIG. 3 is a block diagram illustrating a configuration of a signal detection device according to a second example embodiment of the present invention.

FIG. 3 is a block diagram illustrating a configuration of a signal detection device 200 according to the present example embodiment. In FIG. 3, the signal detection device 200 includes a feature extraction unit 101, a signal information storage unit 102, an analysis unit 103, a detection unit 204, a reception unit 105, and an output unit 106.

The feature extraction unit 101, the signal information storage unit 102, the analysis unit 103, the reception unit 105, and the output unit 106 of the present example embodiment are the same as the components to which the same names and reference signs are assigned in the first example embodiment, respectively, except a difference described below. The reception unit 105 receives a detection target signal. A detection target signal is also simply referred to as a target signal. A detection target signal may be the same as a separation target signal of the first example embodiment. The analysis unit 103 transmits calculated weights, for example, as a weight matrix H.

The detection unit 204 receives, as input, weights transmitted, for example, as a weight matrix H from the analysis unit 103. The detection unit 204 detects an object signal included in a detection target signal on the basis of the received weight matrix H. Each column of a weight matrix H corresponds to a weight of each object sound source included in any time frame of a feature value matrix Y of a detection target signal. Therefore, the detection unit 204 may detect which object signal source exists in each time frame of Y, for example, by comparing a value of each element of H with a threshold. When, for example, a value of an element of H is larger than a threshold, the detection unit 204 may determine that an object signal from an object sound source identified by the element is included in a time frame of a detection target signal identified by the element. When, for example, a value of an element of H is equal to or smaller than a threshold, the detection unit 204 may determine that an object signal from an object sound source identified by the element is not included in a time frame of a detection target signal identified by the element. The detection unit 204 may detect which object signal source exists in each time frame of Y by using a discriminator using a value of each element of H as a feature value. As a training model of a discriminator, for example, a support vector machine (SVM) or a Gaussian mixture model (GMM) is applicable. A discriminator may be achieved in advance by training. The detection unit 204 may transmit, as a detection result, for example, a data value identifying an object signal included in each time frame. As for output, the detection unit 204 may transmit, as a detection result, a matrix Z that has S rows and L columns (S is the number of object signal sources and L is the total number of time frames of Y) and indicates, for example, whether an object signal from each object signal source s is present in each time frame of Y by different values (e.g. 1 and 0). A value of an element of a matrix Z, i.e. a value representing whether an object signal is present may be a score having a continuous value (e.g. a score taking a real value between equal to or larger than 0 and equal to or smaller than 1) indicating a likelihood of presence of an object signal.

The output unit 106 receives a detection result from the detection unit 204, and outputs the received detection result.

Operation

Next, an operation of the signal detection device 200 of the present example embodiment is described in detail with reference to a drawing.

Figure 4:
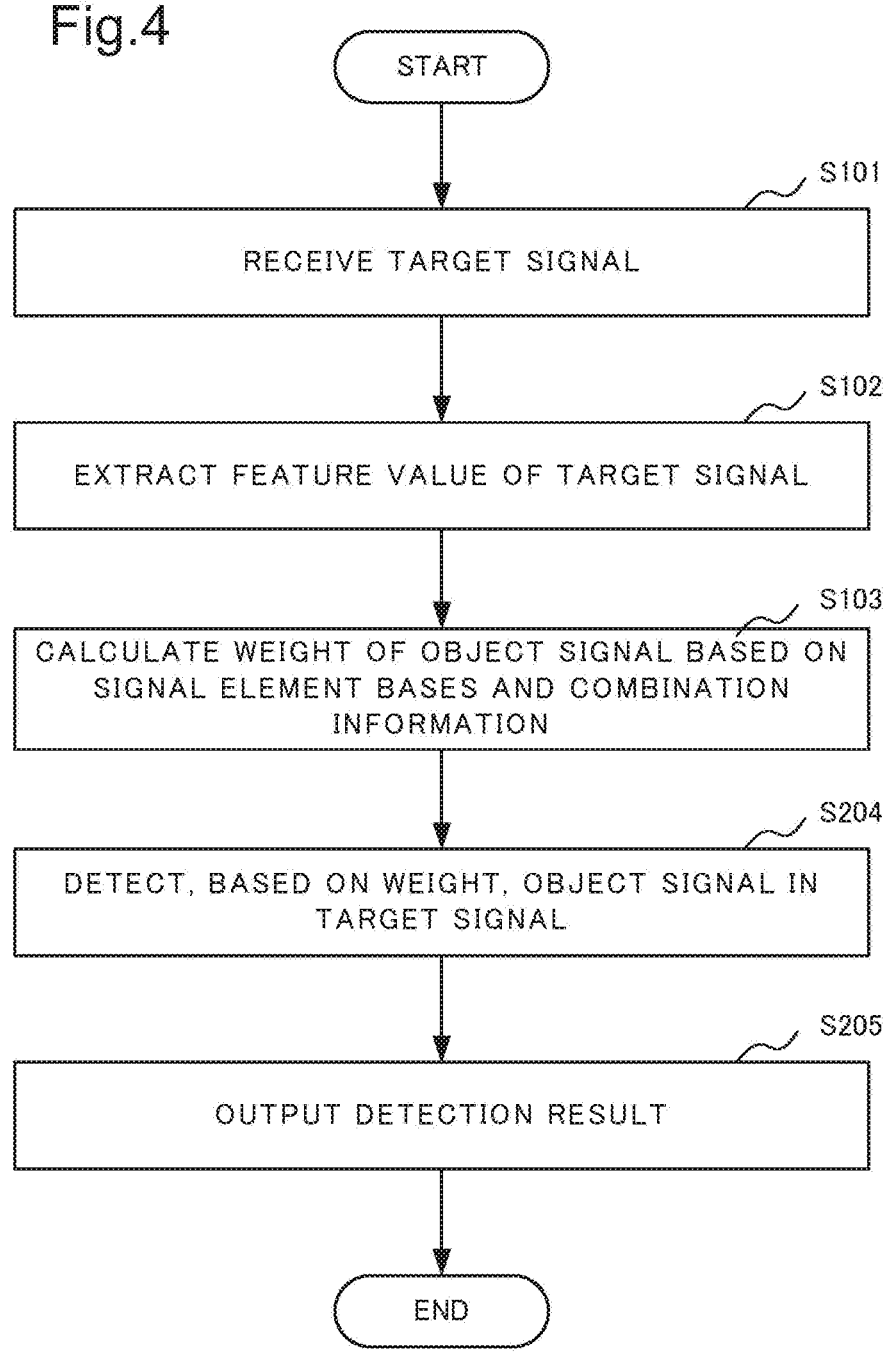
FIG. 4 is a flowchart illustrating an example of an operation of a signal detection device according to each of the second, a fourth, and a sixth example embodiments of the present invention.

FIG. 4 is a flowchart illustrating an example of an operation of the signal detection device 200 of the present example embodiment. An operation from step S101 to step S103 illustrated in FIG. 4 is the same as the operation from step S101 to step S103 of the signal separation device 100, illustrated in FIG. 1, of the first example embodiment.

In step S204, the detection unit 204 detects an object signal in a target signal on the basis of a calculated weight (step S204). In other words, the detection unit 204 determines, based on a calculated weight, whether each object signal is present in a target signal. The detection unit 204 outputs a detection result representing whether each object signal is present in a target signal (step S205).

Advantageous Effect

NPL 1 and the like use a method in which all variations of an object signal are modeled as feature value bases. In this method, a feature value basis matrix becomes larger as variations of an object signal increase, and therefore an enormous memory cost is required. In the present example embodiment, an object signal is modeled as a combination of signal element bases each of which is a basis of a finer unit for expressing all object signals that are targets of separation. Therefore, variations of an object signal are expressed as variations of a method of combining bases. Therefore, even when variations are increased, only a lower dimensional combination matrix may be increased instead of feature value bases themselves of an object signal. In the present example embodiment, a required memory cost is lower than a memory cost required in the technique of NPL 1. Therefore, according to the present example embodiment, a memory cost required for bases in which feature values of components of an object signal is modeled is low, and therefore a signal can be detected while a required memory cost is reduced.

Third Example Embodiment

Next, a third example embodiment of the present invention is described in detail with reference to drawings.

Configuration

Figure 5:
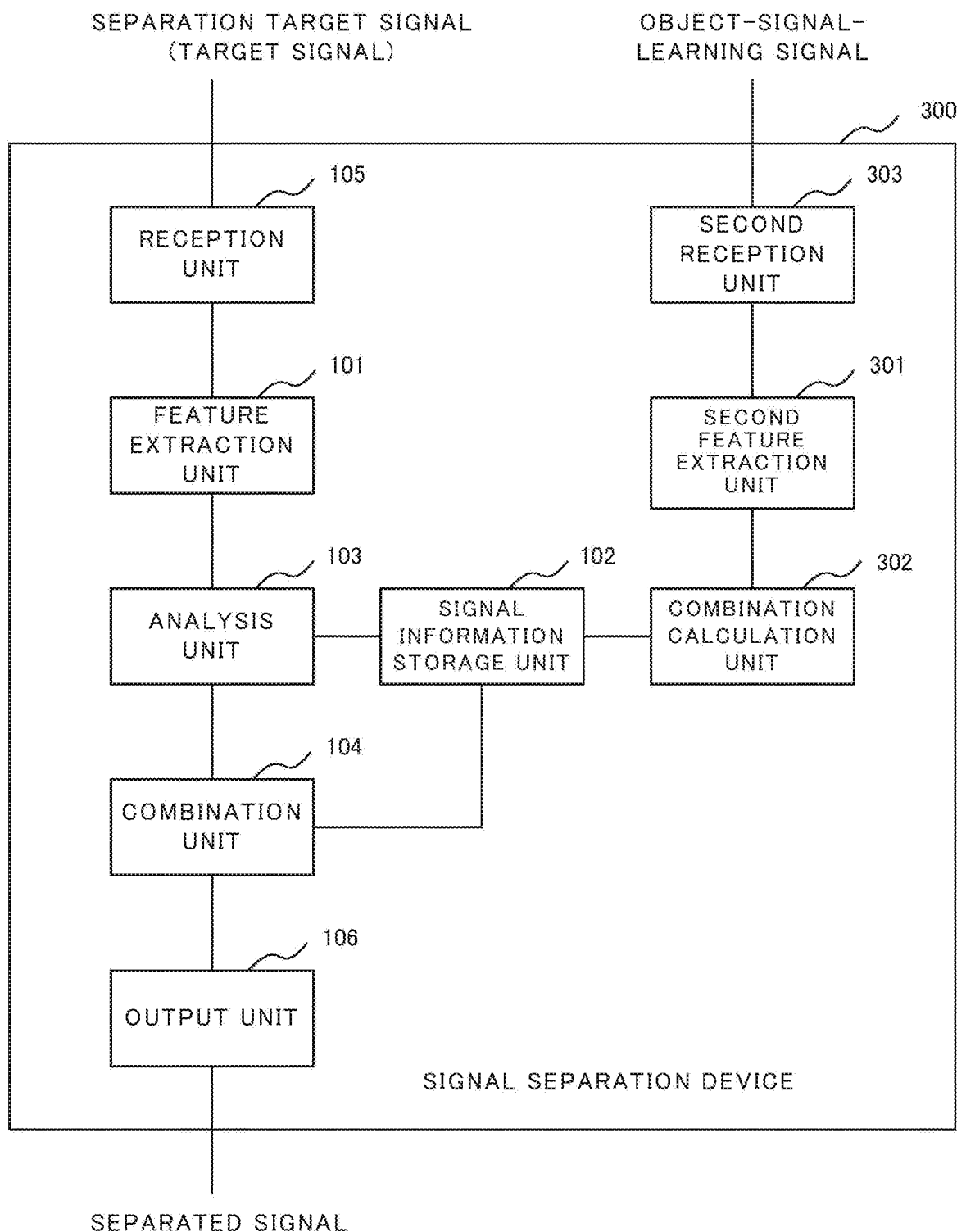
FIG. 5 is a block diagram illustrating an example of a configuration of the signal separation device according to the third example embodiment of the present invention.

FIG. 5 is a block diagram illustrating an example of a configuration of a signal separation device 300 according to the present example embodiment. In FIG. 5, the signal separation device 300 includes a feature extraction unit 101, a signal information storage unit 102, an analysis unit 103, a combination unit 104, a reception unit 105, and an output unit 106. The signal separation device 300 further includes a second feature extraction unit 301, a combination calculation unit 302, and a second reception unit 303. The feature extraction unit 101, the signal information storage unit 102, the analysis unit 103, the combination unit 104, the reception unit 105, and the output unit 106 of the signal separation device 300 operate similarly to the units to which the same names and reference signs are assigned in the signal separation device 100 of the first example embodiment.

The second reception unit 303 receives an object-signal learning signal, for example, from a sensor. An object-signal learning signal is a signal including an included object signal whose an intensity is known. Object-signal learning data may be a signal recorded in such a way that, for example, one time frame includes only one object signal.

The second feature extraction unit 301 receives, as input, the received object-signal-source learning signal, and extracts a feature value from the received object-signal-source learning signal. A feature value extracted from an object-signal-source learning signal is also referred to as a leaning feature value. The second feature extraction unit 301 transmits the generated learning feature value to the combination calculation unit 302 as a learning feature value matrix.

The combination calculation unit 302 calculates, from a learning feature value, signal element bases and combination information. Specifically, the combination calculation unit 302 calculates, from a learning feature value matrix representing a learning feature value, a signal element basis matrix representing signal element bases and a combination matrix representing combination information. In this case, the combination calculation unit 302 may decompose a learning feature value matrix into a signal element basis matrix and a combination matrix, for example, by using ICA, PCA, NMF, or sparse coding. One example of a method of calculating signal element bases and combination information by decomposing a learning feature value matrix into a signal element basis matrix and a combination matrix is described in detail below. The combination calculation unit 302 transmits derived signal element bases and combination information, for example, as a signal element basis matrix and a combination matrix. The combination calculation unit 302 may store a signal element basis matrix and a combination matrix in the signal information storage unit 102.

In the following, the signal separation device 300 is specifically described.

In an example described in the following description, similarly to the description of the related art, a type of a signal generated by a signal source is an acoustic signal.

The second feature extraction unit 301 receives, as input, an object-signal-learning signal, and extracts a learning feature value from the object-signal-learning signal. The second feature extraction unit 301 transmits, as a learning feature value, for example, a learning feature value matrix Y_0 having K rows and L_0 columns to the combination calculation unit 302. K is the number of dimensions of a feature value and L_0 is the total number of time frames of input learning signal. As described above, in a case of an acoustic signal, an amplitude spectrum acquired by applying short-time Fourier transform is frequently used as a feature value. The second feature extraction unit 301 of the present example embodiment extracts, as a feature value, for example, an amplitude spectrum acquired by applying short-time Fourier transform to an object-signal-learning signal.

An object-signal-learning signal is a signal for learning a feature of an object signal that is a target of separation. When there are, for example, three types of object signals which are "(a) piano sound, (b) conversational voice, and (c) footstep", a signal of a piano sound, a signal of a conversational voice, and a signal of a footstep are sequentially input to the signal separation device 300 as object-signal-learning signals. Y_0 is a matrix in which feature value matrices each extracted from signals of object sound sources are combined in a time frame direction. When object-signal learning object signals are the above-described three types of object signals, Y_0_ is described as Y_0=[Y_a, Y_b, Y_c]. A matrix Y_a is a feature value matrix extracted from a signal of a piano sound. A matrix Y_b is a feature value matrix extracted from a signal of a conversational voice. A matrix Y_c is a feature value matrix extracted from a signal of a footstep. In the following, a signal source that generates a piano sound is referred to as an object signal source a. A signal source that generates a conversational voice is referred to as an object signal source b. A signal source that generates a footstep is referred to as an object signal source c.

The combination calculation unit 302 receives a learning feature value from the second feature extraction unit 302. The combination calculation unit 302 may receive, for example, a learning feature value matrix Y_0 from the second feature extraction unit 301. The combination calculation unit 302 calculates, from the received learning feature value, signal element bases and combination information. Specifically, as described below, the combination calculation unit 302 may decompose, as represented by Y_0=GCH_0, described below, a learning feature value matrix Y_0 having K rows and L_0 columns into a signal element basis matrix G, a combination matrix C, and a weight matrix H_0. A signal element basis matrix G is a matrix having K rows and F columns (K is the number of feature value dimensions, and F is the number of signal element bases). A value of F may be determined in advance. A combination matrix C is a matrix having F rows and Q columns (F is the number of signal element bases, and Q is the number of combinations). A weight matrix H_0 is a matrix having Q rows and L_0 columns (Q is the number of combinations, and L_0 is the number of time frames of Y_0).

A matrix G is a matrix in which F K-dimensional signal element bases are arranged. A matrix C is a matrix representing Q patterns of combination of F signal element bases, and is set for each object signal source. In the following description, for example, an object signal source a, an object signal source b, and an object signal source c are modeled. When the numbers of variations of the object signal source a, the object signal source b, and the object signal source c are q(a), q(b), and q(c), respectively, Q is described as Q=q(a)+q(b)+q(c) (and this corresponds to the number of bases R=n(1)+n(2)+ . . . +n(S) described in the description of the related art). The matrix C is described as C=[C_a, C_b, C_c]. For example, a matrix C_a is a matrix having F rows and q(a) columns, and is a matrix representing variations of an object signal source a by q(a) combination manners of F signal element bases. A matrix C_b is a matrix having F rows and q(b) columns, and is a matrix representing variations of an object signal source b by q(b) combination manners of F signal element bases. A matrix C_c is a matrix having F rows and q(c) columns, and is a matrix representing variations of an object signal source c by q(c) combination manners of F signal element bases. H_0 represents weights of object signal components included in Y_0 in time frames of Y_0. A matrix H_0 is described as the following expression in consideration of a relation with the matrices C_a, C_b, and C_c.

$$H_0 = \begin{bmatrix} H_{0a} \\ H_{0b} \\ H_{0c} \end{bmatrix} \quad [\text{Math. 1}]$$

$H_0$, $H_{0a}$, $H_{0b}$, and $H_{0c}$ represent matrices H_0, H_0a, H_0b, and H_0c, respectively. Matrices H_0a, H_0b, and H_0c are a matrix having q(a) rows and L_0 columns, a matrix having q(b) rows and L_0 columns, and a matrix having q(c) rows and L_0 columns, respectively. Y_0 is a learning feature value matrix acquired by combining feature value matrices each extracted from a plurality of object signals. A value of a weight, represented by H_0, of each object signal in each time frame (i.e. a value of each element of the matrix H_0) is known.

A value of a weight of an object signal may be input, in addition to an object-signal-learning signal, to the signal separation device 300 in a form of, for example, a weight matrix. The second reception unit 303 may receive a value of a weight of an object signal and transmit the received value of the weight of the object signal to the combination calculation unit 302 via the second feature extraction unit 301. Information identifying, with respect to each time frame, a signal source of a signal input as an object-signal-learning signal may be input together with an object-signal-learning signal to the second reception unit 303. The second reception unit 303 may receive information identifying a signal source and transmit the received information identifying a signal source to the second feature extraction unit 301. The second feature extraction unit 301 may generate, based on the received information identifying a signal source, a weight for each object signal source represented, for example, by a weight matrix. A value of a weight of an object signal may be input in advance to the signal separation device 300. For example, the combination calculation unit 302 may store a value of a weight of an object signal. An object-signal-learning signal generated on the basis of a value of a weight of an object signal stored in advance may be input to the second reception unit 303 of the signal separation device 300.

As described above, the combination calculation unit 302 stores a matrix H_0 representing a value of weight of each object signal in each time frame. Therefore, the combination calculation unit 302 may calculate a matrix G and a matrix C on the basis of values of a matrix Y_0 and a matrix H_0. For example, non-negative matrix factorization (NMF) using a cost function D_kl(Y_0, GCH_0) of a generalized KL-divergence criterion between Y_0 and GCH_0 is applicable as a method of calculating a matrix G and a matrix C. In an example described below, the combination calculation unit 302 calculates a matrix G and a matrix C as described below by the above-described NMF. The combination calculation unit 302 performs parameter update concurrently optimizing a matrix G and a matrix C in such a way as to minimize the cost function D_kl(Y_0, GCH_0). The combination calculation unit 302 sets, for example, an initial value of each element of G and C to a random value. The combination calculation unit 302 uses the following update expressions for a matrix G and a matrix C.

$$G = G \circ \frac{\frac{Y_0}{GCH_0}(CH_0)^T}{1(CH_0)^T}$$

$$C = C \circ \frac{G^T \frac{Y_0}{GCH_0} H_0^T}{G^T 1 H_0^T}$$

[Math. 2]

The combination calculation unit 302 repeats calculation in accordance with those expressions until the calculation is repeated a predetermined number of times or until a value of the cost function becomes equal to or smaller than a predetermined value. Specifically, the combination calculation unit 302 alternately repeats an update of a matrix G in accordance with the update expression for a matrix G and an update of a matrix C in accordance with the update expression for a matrix C, and thereby calculates a matrix G and a matrix C. A symbol ∘ in the above expressions represents multiplication respectively multiplying elements by elements in matrices. A fraction of matrices represents division respectively dividing elements by elements in matrices, i.e. division respectively dividing values of elements of a matrix that is a numerator by values of elements of a matrix that is a denominator. $Y_0$ represents a matrix Y_0. A matrix 1 in Math. 1 represents a matrix whose size is the same as that of Y_0 and a value of every element of which is 1. The acquired matrix G represents signal element bases in which elements that are bases of all object signals used in calculation are modeled. The acquired matrix C is a matrix representing the above-described combination information. In other words, a matrix C represents a combination manner of combining bases of a matrix G in such a way that a signal corresponding to an object signal is generated with respect to each of a plurality of object signals. The combination calculation unit 302 stores the acquired matrix G and matrix C in the signal information storage unit 102.

Similarly to the feature extraction unit 101 of the first example embodiment, the feature extraction unit 101 of the present example embodiment receives, as input, a separation target signal x(t), and extracts a feature value from the received separation target signal. The feature extraction unit 101 transmits, for example, a feature value matrix Y, which has K rows and L columns and represents the extracted feature values, to the analysis unit 103.

The analysis unit 103 of the present example embodiment receives, for example, a feature value matrix Y transmitted by the feature extraction unit 101, and further reads a matrix G and a matrix C, stored in the signal information storage unit 102. The analysis unit 103 calculates a matrix H in such a way that Y is approximately described as Y≃GCH, and transmits the calculated matrix H to the combination unit 104. NMF using a cost function D_kl(Y, GCH) of a generalized KL-divergence criterion between Y and GCH_0 is applicable as a method of calculating a matrix H. In this case, an update expression of H is as follows.

$$H = H \circ \frac{(GC)^T \frac{Y}{GCH}}{(GC)^T 1}$$

[Math. 3]

The analysis unit 103 repeats calculation of a matrix H in accordance with Math. 3 until the calculation is repeated a predetermined number of times or until a value of the cost function becomes equal to or smaller than a predetermined value, and thereby calculates a matrix H. The analysis unit 103 transmits the acquired matrix H to the combination unit 104.

The combination unit 104 receives a weight matrix H transmitted from the analysis unit 103, and reads a matrix G and a matrix C stored in the signal information storage unit 102. The combination unit 104 calculates, by using the weight matrix H, the matrix G, and the matrix C, a separated signal that is a component of a signal generated from an object sound source and is included in a target signal (i.e. a separation target signal in the present example embodiment). The combination unit 104 combines, with respect to each object sound source, signal element bases in accordance with a combination method, and thereby generates a separated signal x_s(t) for each object sound source s. The combination unit 104 transmits the generated separated signal x_s(t) to the output unit 106. When a matrix Y_s is represented by, for example, an expression Y_s=G·C_s·H_s using a combination C_s related to an object sound source s in a matrix C and a matrix H_s representing weights for C_s in a matrix H, the matrix Y_s can be considered to be a component of a signal generated by an object sound source s in an input signal x(t). Therefore, a component x_s(t) of an object sound source s in an input signal x(t) is acquired by applying, to Y_s, inverse conversion of feature value conversion used for calculating a feature value matrix Y by the feature extraction unit 101 (e.g. inverse Fourie transform in case short-time Fourie transform is used).

Operation

Next, an operation of the signal separation device 300 according to the present example embodiment is described in detail with reference to a drawing.

Figure 6:
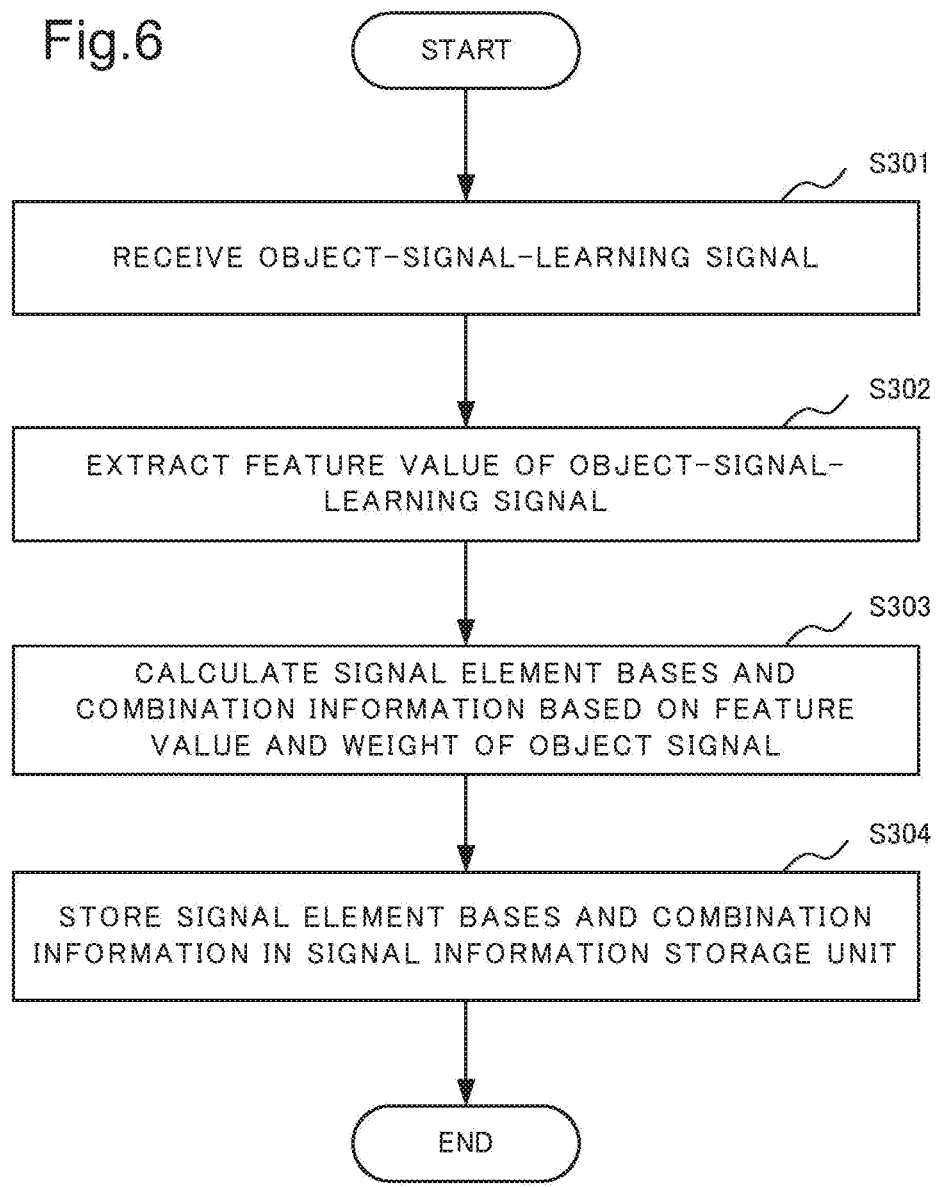
FIG. 6 is a flowchart illustrating an example of an operation of a signal separation device according to each of the third, fourth, and fifth example embodiments of the present invention.

FIG. 6 is a flowchart illustrating an example of an operation of learning an object signal by the signal separation device 300 according to the present example embodiment.

In FIG. 6, first, the second reception unit 303 receives an object-signal-learning signal (step S301). Next, the second feature extraction unit 301 extracts feature values of the object-signal-learning signal (step S302). The second feature extraction unit 301 may transmit the extracted feature values to the combination calculation unit 302, for example, in a form of a feature value matrix. The combination calculation unit 302 calculates signal element bases and combination information on the basis of the extracted feature value and a value, acquired in advance, of a weight of an object signal (step S303). For example, as described above, the combination calculation unit 302 may calculate, on the basis of a feature matrix and a weight matrix representing values of weights, a signal element basis matrix representing signal element bases and a combination matrix representing combination information. The combination calculation unit 302 stores the signal element bases and the combination information in the signal information storage unit 102 (step S304). The combination calculation unit 302 may store, for example, a signal element matrix representing the signal element bases and a combination matrix representing the combination information in the signal information storage unit 102.

Next, an operation of separating an object signal by the signal separation device 300 of the present example embodiment is described.

FIG. 2 is a flowchart illustrating an operation of separating an object signal by the signal separation device 300 according to the present example embodiment. An operation of separating an object signal by the signal separation device 300 of the present example embodiment is the same as the operation of separating an object signal by the signal separation device 100 of the first example embodiment.

Advantageous Effect

The present example embodiment has, as a first advantageous effect, the same advantageous effect as the advantageous effect of the first example embodiment. A reason is the same as the reason why the advantageous effect of the first example embodiment is produced.

As described above, NPL 1 and the like uses a method of modeling all variations of an object signal as feature value bases. In this method, a feature value basis matrix becomes larger as variations of an object signal increase, and therefore an enormous memory cost is required. In the present example embodiment, an object signal is modeled as a combination of signal element bases each of which is a basis of a finer unit for expressing all object signals that are targets of separation. Therefore, variations of an object signal are expressed as variations of a method of combining bases. Therefore, even when variations are increased, only a lower dimensional combination matrix may be increased instead of feature value bases themselves of an object signal. In the present example embodiment, a memory cost lower than a memory cost required in the technique of a required literature 1 is required.

For example, in the related art, whole variations of an object signal need to be stored as feature value bases. Therefore, when 1000 variations of an object signal source are modeled by K=1000 bases whose number is the number of feature values, information that needs to be stored is, for example, a matrix having a number of bases corresponding to a feature value basis matrix which has 1000 rows and 10000 columns and has 10000000 elements. However, in the present example embodiment, variations of an object signal source are expressed by a combination matrix. Therefore, when the number of signal element bases is, for example, F=100 under a condition that, for example, the number of feature value dimensions is K=1000 and the number of combinations is Q=10000, the numbers of elements of a matrix G and a matrix C calculated by the combination calculation unit 302 and stored in the signal information storage unit 102 are K*F=100000 and F*Q=1000000, respectively. In the present example embodiment, the number of elements stored is 1100000, and is one-ninth of the number of elements needed to be stored in the related art. Therefore, the present example embodiment has, as a second advantageous effect, an advantageous effect in that bases can be generated at low memory cost while reducing a memory cost needed in order to store bases in which feature values of components of object signals are modeled.

Fourth Example Embodiment

Next, a signal detection device according to a fourth example embodiment of the present invention is described in detail with reference to drawings.

Configuration

Figure 7:
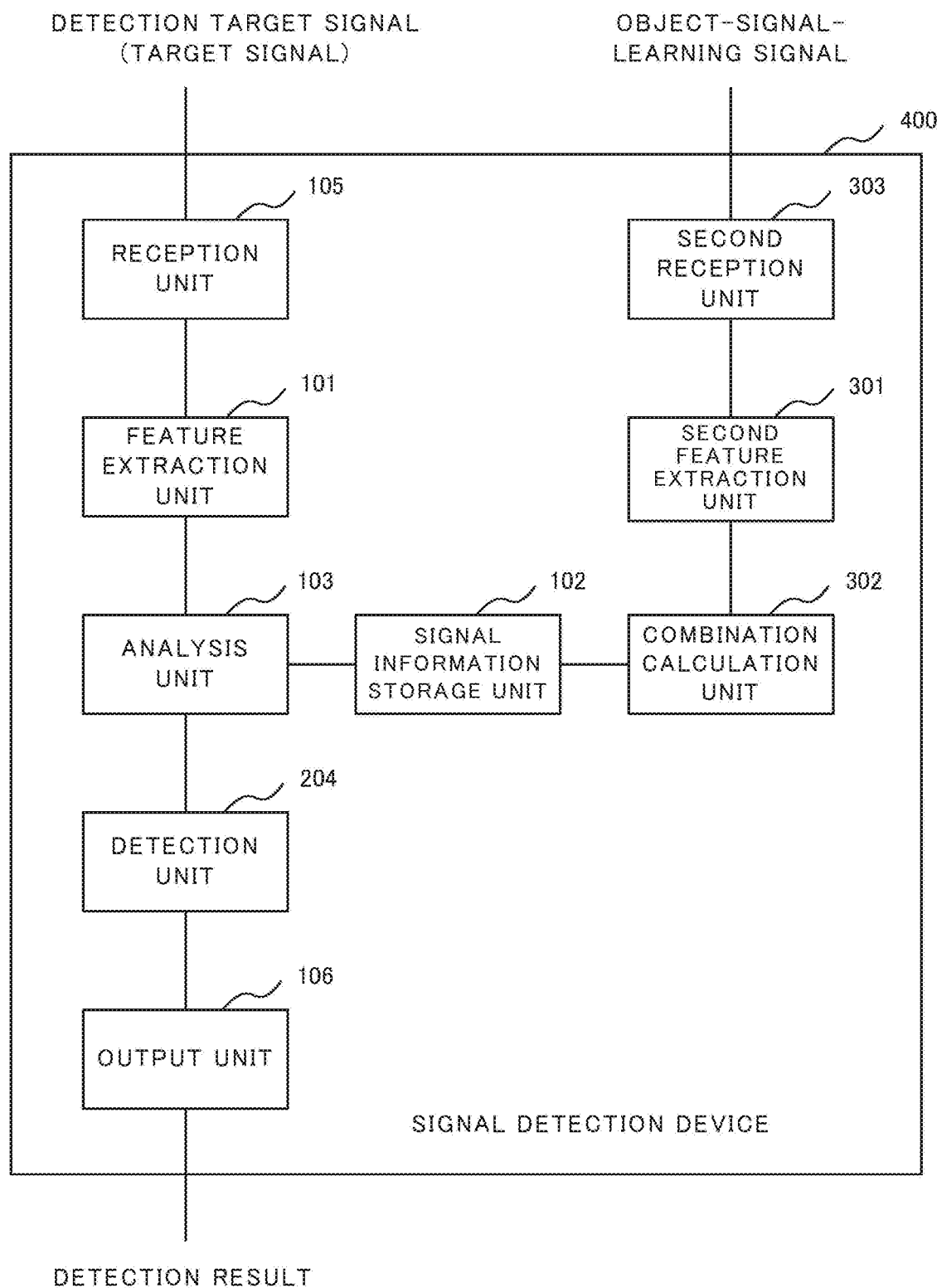
FIG. 7 is a block diagram illustrating an example of a configuration of the signal detection device according to the fourth example embodiment of the present invention.

FIG. 7 is a block diagram illustrating an example of a configuration of a signal detection device 400 according to the present example embodiment. In FIG. 7, the signal detection device 400 includes a feature extraction unit 101, a signal information storage unit 102, an analysis unit 103, a reception unit 105, a detection unit 204, an output unit 106, a second feature extraction unit 301, a combination calculation unit 302, and a second reception unit 303. In comparison with the signal separation device 300 of the third example embodiment illustrated in FIG. 5, the signal detection device 400 includes a detection unit 204 instead of a combination unit 104. The feature extraction unit 101, the signal information storage unit 102, the analysis unit 103, the reception unit 105, the detection unit 204, and the output unit 106 of the present example embodiment are the same as units to which the same names and reference signs are assigned in the second example embodiment. The second feature extraction unit 301, the combination calculation unit 302, and the second reception unit 303 are the same as units to which the same names and reference signs are assigned in the third example embodiment.

Hereinafter, the detection unit 204 is specifically described.

The detection unit 204 receives, as input, a weight matrix H that is transmitted by the analysis unit 103 and represents a weight of an object signal. The detection unit 204 detects, based on the weight matrix H, an object signal included in a detection target signal. Each column of a weight matrix H represents a weight of an object sound source included in a time frame of a feature value matrix Y of a detection target signal. Therefore, the detection unit 204 may execute threshold processing for a value of each element of a matrix H, and thereby detect an object signal included as a component in each time frame of Y. Specifically, for example, when a value of an element of a matrix H is larger than a predetermined threshold, the detection unit 204 may determine that an object signal related to the element is included in a time frame indicated by a column including the element. For example, when a value of an element of a matrix H is equal to or smaller than a predetermined threshold, the detection unit 204 may determine that an object signal related to the element is not included in a time frame indicated by a column including the element. In other words, the detection unit 204 may detect, for example, an element of a matrix H having a value larger than a threshold and detect an object signal related to the element as an object signal included in a time frame indicated by an inferior including the detected element.

The detection unit 204 may detect an object signal included in each time frame of Y by using a discriminator that uses a value of each element of a matrix H as a feature value. A discriminator may be a discriminator trained by using an SVM, a GMM or the like, for example. The detection unit 204 may transmit, to the output unit 106, as a result of detection of an object signal, a matrix Z having S rows and L columns (S is the number of object signal sources and L is the total number of time frames of Y) in which each element indicates, by using 1 or 0, presence or absence of an object signal source s in a time frame of Y. A value of an element of a matrix Z indicating presence or absence of an object signal may be a score having a continuous value (e.g. a real value from 0 to 1).

Operation

Next, an operation of the signal detection device 400 according to the present example embodiment is described in detail with reference to drawings.

FIG. 4 is a flowchart illustrating an example of an operation of detecting an object signal by the signal detection device 400 of the present example embodiment. An operation of detecting an object signal by the signal detection device 400 is the same as the operation by the signal detection device 200 of the second example embodiment illustrated in FIG. 4.

FIG. 6 is a flowchart illustrating an example of an operation of learning an object signal by the signal detection unit 400 of the present example embodiment. An operation of learning by the signal detection unit 400 of the present example embodiment is the same as the operation of learning by the signal separation device 300 of the third example embodiment illustrated in FIG. 6.

Advantageous Effect

The present example embodiment has, as a first advantageous effect, the same advantageous effect as the advantageous effect of the second example embodiment. A reason is the same as the reason why the advantageous effect of the second example embodiment is produced. The present example embodiment has, as a second advantageous effect, the same advantageous effect as the second advantageous effect of the third example embodiment. A reason why the advantageous effect is produced is the same as the reason why the second advantageous effect of the third example embodiment is produced.

Fifth Example Embodiment

Next, a signal separation device according to a fifth example embodiment of the present invention is described in detail with reference to drawings.

Configuration

Figure 8:
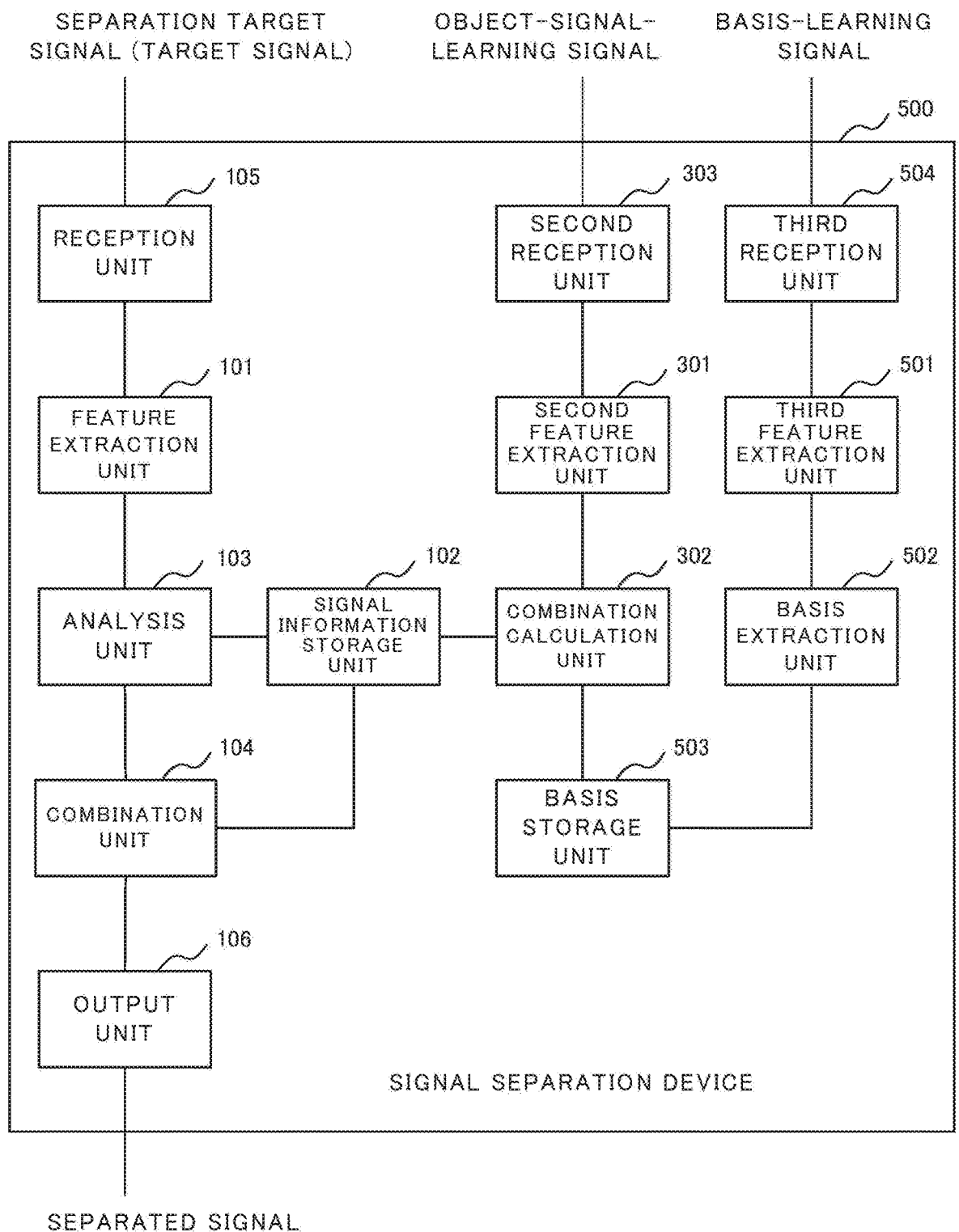
FIG. 8 is a block diagram illustrating an example of a configuration of the signal separation device according to the fifth example embodiment of the present invention.

FIG. 8 is a block diagram illustrating an example of a configuration of a signal separation device 500 of the present example embodiment. The signal separation device 500 includes, similarly to the signal separation device 100 of the first example embodiment, a feature extraction unit 101, a signal information storage unit 102, an analysis unit 103, a combination unit 104, a reception unit 105, and an output unit 106. The feature extraction unit 101, the signal information storage unit 102, the analysis unit 103, the combination unit 104, the reception unit 105, and the output unit 106 of the present example embodiment are the same as units to which the same names and reference signs are assigned in the signal separation device 100 of the first example embodiment. The signal separation device 500 further includes, similarly to the signal separation device 300 of the third example embodiment, a second feature extraction unit 301, a combination calculation unit 302, and a second reception unit 303. The second feature extraction unit 301, the combination calculation unit 302, and the second reception unit 303 according to the present example embodiment are the same as units to which the same names and reference signs are assigned in the signal separation device 300 of the third example embodiment except a difference to be described later. The signal separation device 500 further includes a third feature extraction unit 501, a basis extraction unit 502, a basis storage unit 503, and a third reception unit 504.

The third reception unit 504 receives a basis-learning signal and transmits the received basis-learning signal to the third feature extraction unit 501. A basis-learning signal is described in detail later.

The third feature extraction unit 501 receives, as input, a basis-learning signal, and extracts feature values from the received basis-learning signal. The third feature extraction unit 501 transmits, as a basis-learning feature value matrix, the extracted feature values, for example, in a form of a matrix to the basis extraction unit 502.

The basis extraction unit 502 receives feature values from the third feature extraction unit 501, and extracts signal element bases from the received feature value. Specifically, the basis extraction unit 502 extracts a signal element basis matrix from a basis-learning feature value matrix received from the third feature extraction unit 501. The basis extraction unit 502 stores the extracted signal element basis matrix in the basis storage unit 503.

The basis storage unit 503 stores signal element bases extracted by the basis extraction unit 502. Specifically, the basis storage unit 503 stores a signal element basis matrix transmitted by the basis extraction unit 502.

The combination calculation unit 302 calculates combination information on the basis of feature values extracted by the second feature extraction unit 301, a signal element basis stored in the basis storage unit 503, and a weight of an object signal. Specifically, the combination calculation unit 302 calculates a combination matrix on the basis of a feature value matrix received from the feature extraction unit 301, a signal element basis matrix stored in the basis storage unit 503, and a weight matrix given in advance. The combination calculation unit 302 of the present example embodiment may calculate a combination matrix by using the same method as the method of calculating a combination matrix by the combination calculation unit 302 of the third example embodiment.

The third feature extraction unit 501 receives, as input, a basis-learning signal, extracts feature values from the received basis-learning signal, and transmits the extracted feature values to the basis extraction unit 502. The third feature extraction unit 501 may transmit, to the basis extraction unit 502, a basis-learning feature value matrix $Y\_g$ that has K rows and $L\_g$ columns and represents the extracted feature values of the basis-learning signal. K is the number of dimensions of a feature value, and $L\_g$ is the total number of time frames of an input basis-learning signal. As described above, when a received signal is an acoustic signal, an amplitude spectrum acquired by applying short-time Fourier transform to the signal is frequently used as a feature value of the signal. A basis-learning signal is a signal for learning bases used for representing an object signal that is a target to be separated as a separated signal. A basis learning signal may be, for example, a signal including, as components, signals from all object signal sources that are targets to be separated as separated signals. A basis-learning signal may be a signal in which, for example, signals each of which is from one of a plurality of object signal sources are temporally connected.

In a matrix $Y\_g$, an object signal included in each time frame may not necessarily be determined. A matrix $Y\_g$ may include, as components, all object signals that is targets to be separated. A weight (e.g. the above-described weight matrix) of a component of an object signal in each time frame of a matrix $Y\_g$ may not necessarily be acquired.

The basis extraction unit 502 receives, as input, feature values transmitted, for example, as a basis-learning feature value matrix $Y\_g$, by the third feature extraction unit 501. The basis extraction unit 502 calculates signal element bases and weight from the received feature values. Specifically, the basis extraction unit 502 decomposes the received basis-learning feature value matrix $Y\_g$ into a signal element basis matrix G that is a matrix having K rows and F columns (K is the number of dimensions of a feature value and F is the number of signal element bases) and a weight matrix $H\_g$ having F rows and L_g columns (L_g is the number of time frames of the matrix Y_g). F may be determined in advance appropriately. An expression representing decomposition of a matrix Y_g into a matrix G and a matrix H is described as Y_g=GH_g.

Here, a matrix G is a matrix in which F K-dimensional feature value bases are arranged. A matrix H_g is a matrix representing a weight related to each signal element basis of G in each time frame of a matrix Y_g. Non-negative matrix factorization (NMF) using a cost function D_kl(Y_g, GH_g) of a generalized KL-divergence criterion between Y_g and GH_G is applicable as a method for calculating a matrix G and a matrix H_g. Hereinafter, an example using the NMF is described. The basis extraction unit 502 executing NMF performs parameter update in such a way as to concurrently optimize a matrix G and a matrix H_g minimizing a cost function D_kl(Y_g, GH_g). The basis extraction unit 502 sets, for example, an initial value of each element of a matric G and a matrix H_g to a random value. The basis extraction unit 502 repeats an update of a matrix G and an update of a matrix H_g in accordance with the following update expression for a matrix G and a matrix H_g.

$$G = G \circ \frac{\frac{Y_g}{GH_g} H_g^T}{1 H_g^T} \quad [\text{Math. 4}]$$

$$H_g = H_g \circ \frac{G^T \frac{Y_g}{GH_g}}{G^T 1}$$

The basis extraction unit 502 repeats the update until the update is repeated a predetermined number of times or until a value of the cost function becomes equal to or smaller than a predetermined value. A symbol ○ in the above expression represents multiplication respectively multiplying elements by elements of matrices, and a fraction of matrices represents division respectively dividing elements by elements of matrices. Yg and Hg represents a matrix Y_g and a matrix H_g, respectively. The basis extraction unit 502 alternately repeats an update of a matrix G and an update of a matrix H_g, and thereby acquires a matrix G and a matrix H_g. Y_g including components of all object signals that are targets of separation can be described well by using the acquired signal element basis matrix G, i.e., the signal element basis matrix G corresponds to bases that are bases of components of all object signals that are targets of separation The basis extraction unit 502 stores the acquired matrix G in the basis storage unit 503.

The combination calculation unit 302 receives feature values, transmitted by the second feature extraction unit 301, of an object-signal-learning signal. Specifically, the combination calculation unit 302 receives a learning feature value matrix Y_0. The combination calculation unit 302 reads signal element bases stored in the basis storage unit 503. Specifically, the combination calculation unit 302 reads a signal element basis matrix G stored in the basis storage unit 503. The combination calculation unit 302 calculates combination information on the basis of a feature value, a signal element basis, and a weight. Specifically, the combination calculation unit 302 calculates a combination matrix C acquired by decomposing a matrix Y_0 into Y_0=GCH_0, i.e. by decomposing a learning feature value matrix Y_0 having K rows and L_0 columns into a signal element basis matrix G, a combination matrix C, and a weight matrix H_0.

A signal element basis matrix G is a matrix having K rows and F columns (K is the number of dimensions of a feature value, and F is the number of signal element bases). A combination matrix C is a matrix having F rows and Q columns (F is the number of signal element bases, and Q is the number of combinations). A weight matrix H_0 is a matrix having Q rows and L_0 columns (Q is the number of combinations, and L_0 is the number of time frames of Y_0). A method of calculating a combination matrix C is described in detail below.

Here, a matrix C is a matrix representing Q patterns of combinations each of which combines F signal element bases. A combination is determined for an individual object signal. Similarly to the third example embodiment, a matrix H_0 is known. In other words, similarly to the combination calculation unit 302 of the third example embodiment, the combination calculation unit 302 of the present example embodiment holds, for example, as a matrix H_0, a weight of an object signal in an object-signal-learning signal. The combination calculation unit 302 reads a signal element basis matrix G from the basis storage unit 503. As described above, the combination calculation unit 302 of the third example embodiment calculates a signal element basis matrix G and a combination matrix C. The combination calculation unit 302 of the present example calculates a combination matrix C. Non-negative matrix factorization (NMF) using a cost function D_kl(Y_0, GCH_0) of a generalized KL-divergence criterion between Y_0 and GCH_0 is applicable as a method of calculating a combination matrix C. An example of a method of calculating a combination matrix C on the basis of the above-described NMF is described below. The combination calculation unit 302 sets an initial value of each element of a matrix C to a random value. The combination calculation unit 302 repeats calculation in accordance with the following update expression for a matrix C.

$$C = C \circ \frac{G^T \frac{Y_0}{GCH_0} H_0^T}{G^T 1 H_0^T} \quad [\text{Math. 5}]$$

The combination calculation unit 302 repeats the calculation until the calculation is repeated a predetermined number of times or until a value of a cost function becomes equal to or smaller than a predetermined value and thereby calculates a matrix C. A symbol ○ in the above equation represents multiplication respectively multiplying elements by elements of matrices, and a fraction of matrices represents division dividing elements by elements of matrices. A matrix 1 represents a matrix whose size is the same as that of Y_0 and a value of every element of which is 1. An acquired combination matrix C represents combination information representing a combination by which signal element bases represented by a signal element basis matrix G stored in the basis storage unit 503 is combined in such a way as that a signal corresponding to an object signal is acquired. The combination calculation unit 302 stores an acquired combination matrix C and a signal element basis matrix G read from the basis storage unit 503 in the signal information storage unit 102.

Operation

Next, an operation of the signal separation device 500 of the present example embodiment is described in detail with reference to a drawing.

FIG. 2 is a flowchart illustrating an operation of separating a signal by the signal separation device 500 according to the present example embodiment. An operation of separating a signal by the signal separation device 500 of the present example embodiment is the same as the operation of separating a signal by the signal separation device 100 of the first example embodiment.

FIG. 6 is a flowchart illustrating an operation of learning an object signal by the signal separation device 500 of the present example embodiment. An operation of learning an object signal by the signal separation device 500 of the present example embodiment is the same as the operation of learning an object signal by the signal separation device 300 of the third example embodiment.

Figure 9:
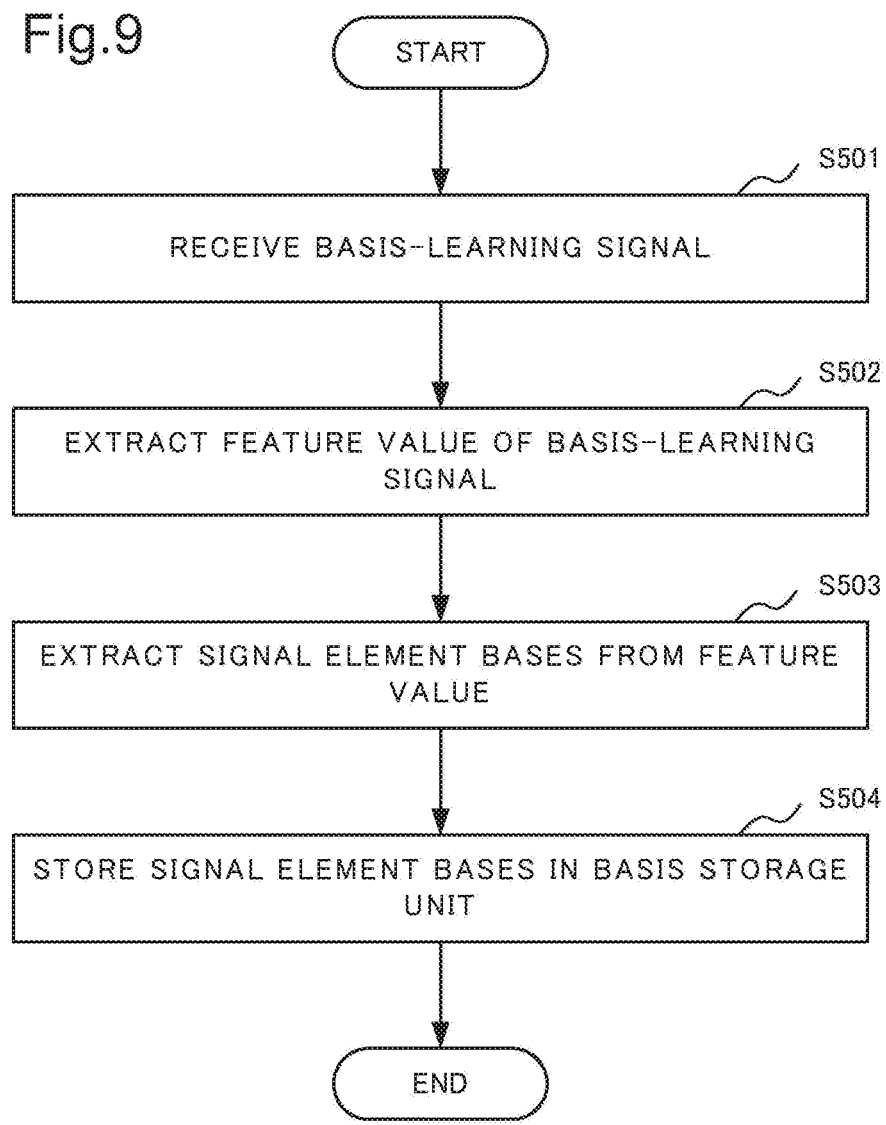
FIG. 9 is a flowchart illustrating an example of an operation of a signal separation device according to each of the fifth and sixth example embodiments of the present invention.

FIG. 9 is a flowchart illustrating an operation of learning bases by the signal separation device 500 of the present example embodiment.

In FIG. 9, first, the third reception unit 504 receives a basis-learning signal (step S501). Next, the third feature extraction unit 501 extracts feature values of the basis-learning signal (step S502). The third feature extraction unit 501 may generate a feature value matrix (i.e. a basis-learning feature value matrix) representing the extracted feature values. Next, the basis extraction unit 502 extracts signal element bases from the extracted feature value (step S503). The basis extraction unit 502 may calculate, as described above, a signal element basis matrix representing the signal element bases. Next, the basis extraction unit 502 stores, in the basis storage unit 503, the extracted signal element bases represented, for example, by a signal element basis matrix.

Advantageous Effect

The present invention has the same advantageous effects as the first advantageous effect and the second advantageous effect of the third example embodiment. The reason is similar to the reason why the advantageous effects of the third example embodiment is produced.

The present example embodiment has, as a third advantageous effect, an advantageous effect that accuracy in extraction of a signal element basis and combination information can be improved.

The basis extraction unit 502 of the present example embodiment first calculates signal element bases represented by a signal element basis matrix G. The combination calculation unit 302 calculates, by using the calculated signal element basis matrix G, a combination matrix C representing combination information. Therefore, it is unnecessary to calculate a solution to a concurrent optimization problem of two matrices (e.g. a matrix G and a matrix C). This problem is generally uneasy to calculate a solution accurately. Therefore, the signal separation device 500 of the present example embodiment can accurately extract a matrix G and a matrix C, i.e. signal element bases and combination information.

In other words, according to the present example embodiment, signal element bases and combination information can be accurately extracted.

Sixth Example Embodiment

Next, a signal detection device according to a sixth example embodiment of the present invention is described in detail with reference to drawings.

Configuration

Figure 10:
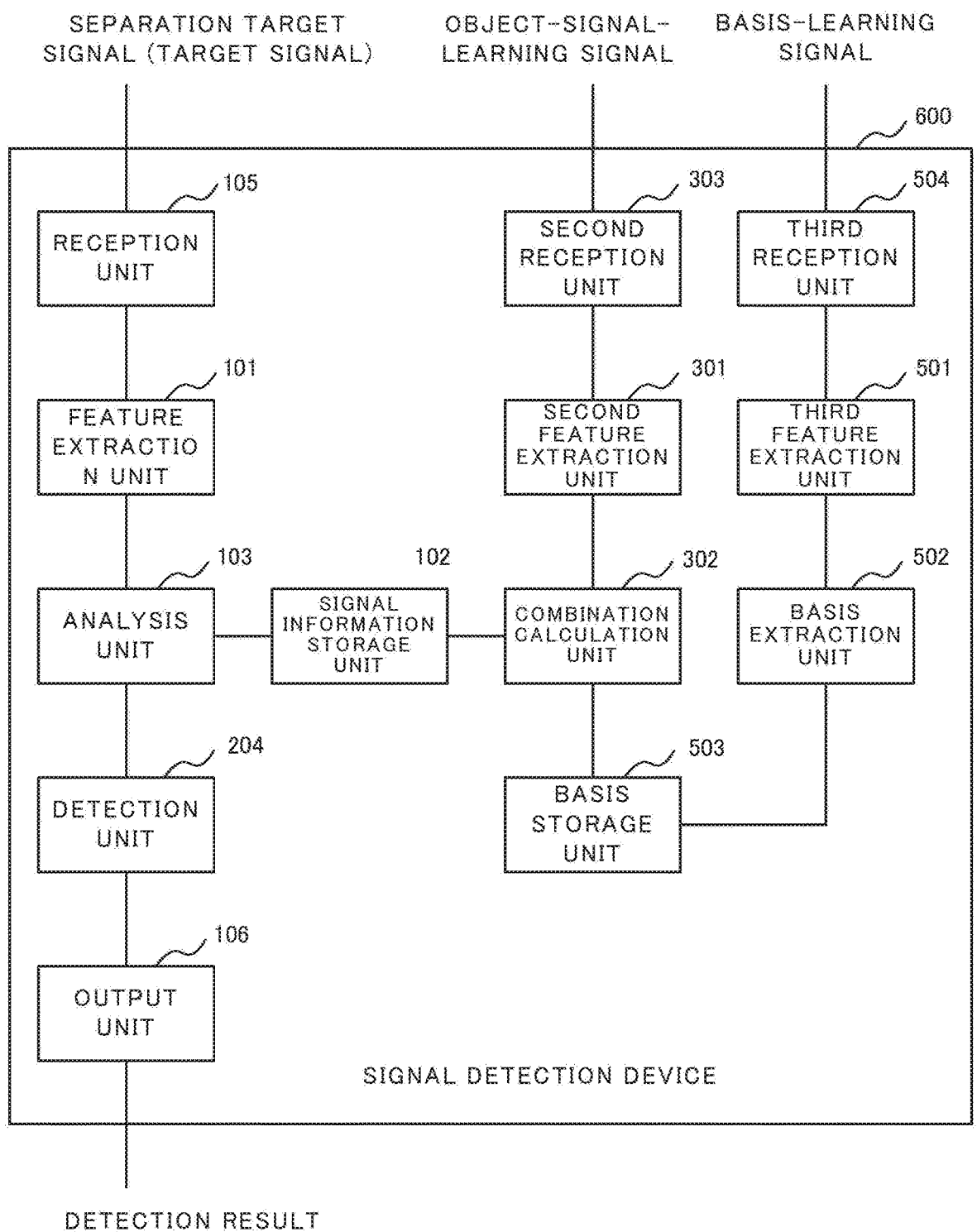
FIG. 10 is a diagram illustrating an example of a configuration of the signal detection device according to the sixth example embodiment of the present invention.

FIG. 10 is a diagram illustrating a configuration of a signal detection device 600 of the present example embodiment. In FIG. 10, the signal detection device 600 of the present example embodiment includes a feature extraction unit 101, a signal information storage unit 102, an analysis unit 103, a reception unit 105, an output unit 106, and a detection unit 204. The feature extraction unit 101, the signal information storage unit 102, the analysis unit 103, the reception unit 105, the output unit 106, and the detection unit 204 are the same as units to which the same names and reference signs are assigned in the second example embodiment. The signal detection device 600 further includes a second feature extraction unit 301, a combination calculation unit 302, and a second reception unit 303. The second feature extraction unit 301, the combination calculation unit 302, and the second reception unit 303 of the present example embodiment are the same as units to which the same names and reference signs are assigned in the third example embodiment. The signal detection device 600 further includes a third feature extraction unit 501, a basis extraction unit 502, a basis storage unit 503, and a third reception unit 504. The third feature extraction unit 501, the basis extraction unit 502, the basis storage unit 503, and the third reception unit 504 of the present example embodiment are the same as units to which the same names and reference signs are assigned in the fifth example embodiment.

Operation

Next, an operation of the signal detection device 600 of the present example embodiment is described in detail with reference to drawings. FIG. 4 is a flowchart illustrating an operation of detecting an object signal by the signal detection device 600 of the present example embodiment. An operation of detecting an object signal by the signal detection device 600 of the present example embodiment is the same as the operation of detecting an object signal by the signal detection device 200 of the second example embodiment.

FIG. 6 is a flowchart illustrating an operation of learning an object signal by the signal detection device 600 of the present example embodiment. An operation of learning an object signal by the signal detection device 600 of the present example embodiment is the same as the operation of learning an object signal by the signal separation device 300 of the third example embodiment.

FIG. 9 is a flowchart illustrating an operation of learning bases by the signal detection device 600 of the present example embodiment. An operation of learning bases by the signal detection device 600 of the present example embodiment is the same as the operation of learning bases by the signal detection device 500 of the fifth example embodiment.

Advantageous Effect

The present example embodiment has the same advantageous effects as the first advantageous effect and the second advantageous effect of the fourth example embodiment. The reason is the same as the reason why the first advantageous effect and the second advantageous effect of the fourth example embodiment is produced.

The present example embodiment has the same advantageous effect as the third advantageous effect of the fifth example embodiment. The reason is the same as the reason why the third advantageous effect of the fifth example embodiment is produced.

Seventh Example Embodiment

Next, a seventh example embodiment of the present invention is described in detail with reference to drawings.

Configuration

Figure 11:
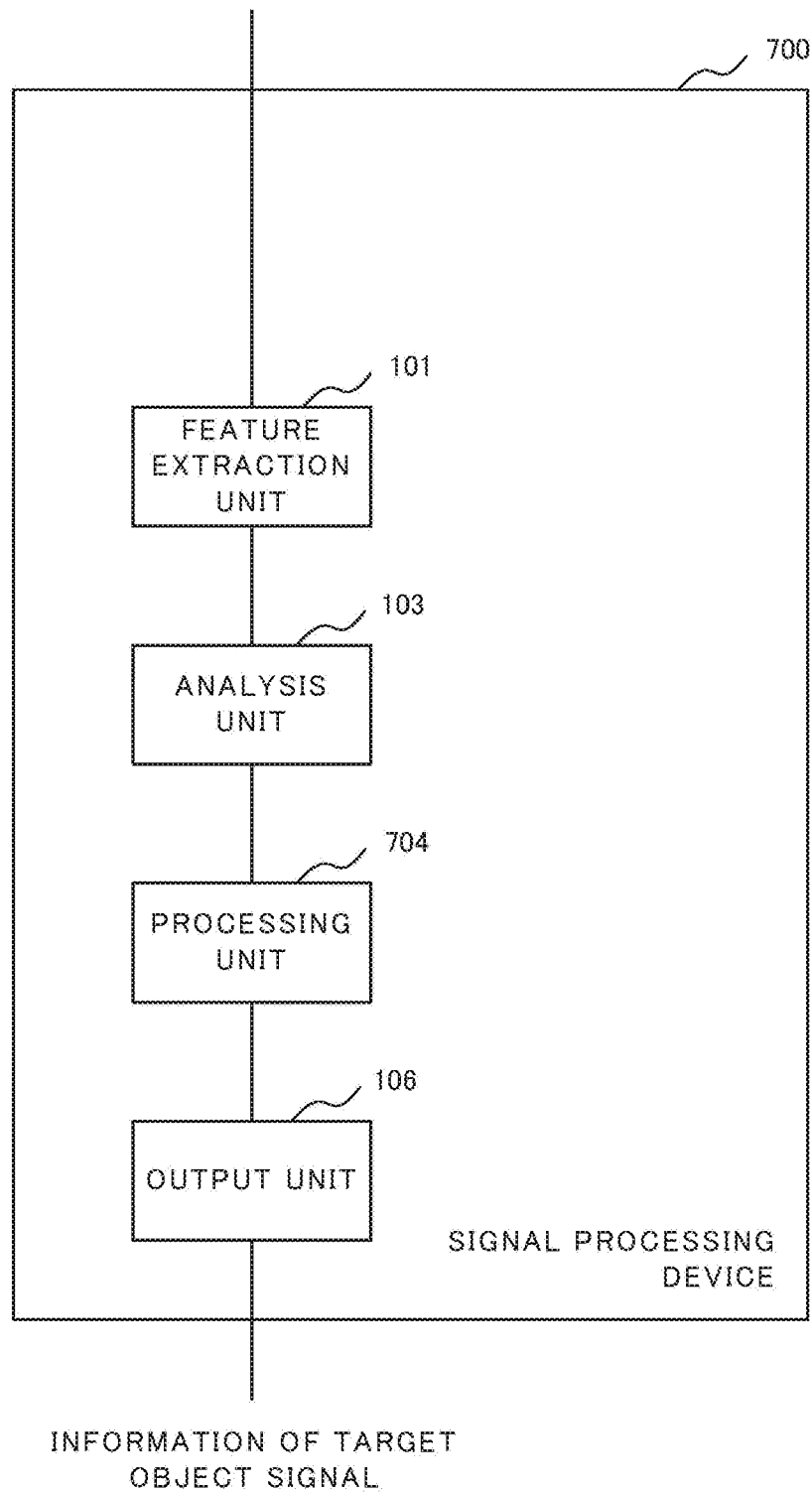
FIG. 11 is a block diagram illustrating an example of a configuration of a signal processing device according to a seventh example embodiment of the present invention.

FIG. 11 is a block diagram illustrating an example of a configuration of a signal processing device 700 according to the present example embodiment.

In FIG. 11, the signal processing device 700 includes a feature extraction unit 101, an analysis unit 103, a processing unit 704, and an output unit 106.

The feature extraction unit 101 extracts, from a target signal, a feature value representing a feature of the target signal. The analysis unit 103 calculates, based on the extracted feature value, signal element bases by which a plurality of types of object signals is described using linear combination, and information of the linear combination, a weight representing an intensity of each of the plurality of object signals included in the target signal. Information of linear combination is the above-described combination information. The processing unit 704 derives, based on the weight, information of a target object signal that is at least one type of an object signal included in the target signal. The output unit 106 outputs the information of the target object signal.

The processing unit 704 may be, for example, the combination unit 104 included in a signal separation device according to the first, the third, or the fifth example embodiment. In this case, information of a target object signal is a separated signal of a target object signal. The processing unit 704 may be, for example, the detection unit 204 included in a signal separation device according to the second, the fourth, or the sixth example embodiment. In this case, information of a target object signal is, for example, information indicating whether a target object signal is included in each time frame of a target signal. Information of a target object signal may be, for example, information indicating a target object signal included in each time frame of a target signal.

Operation

Figure 12:
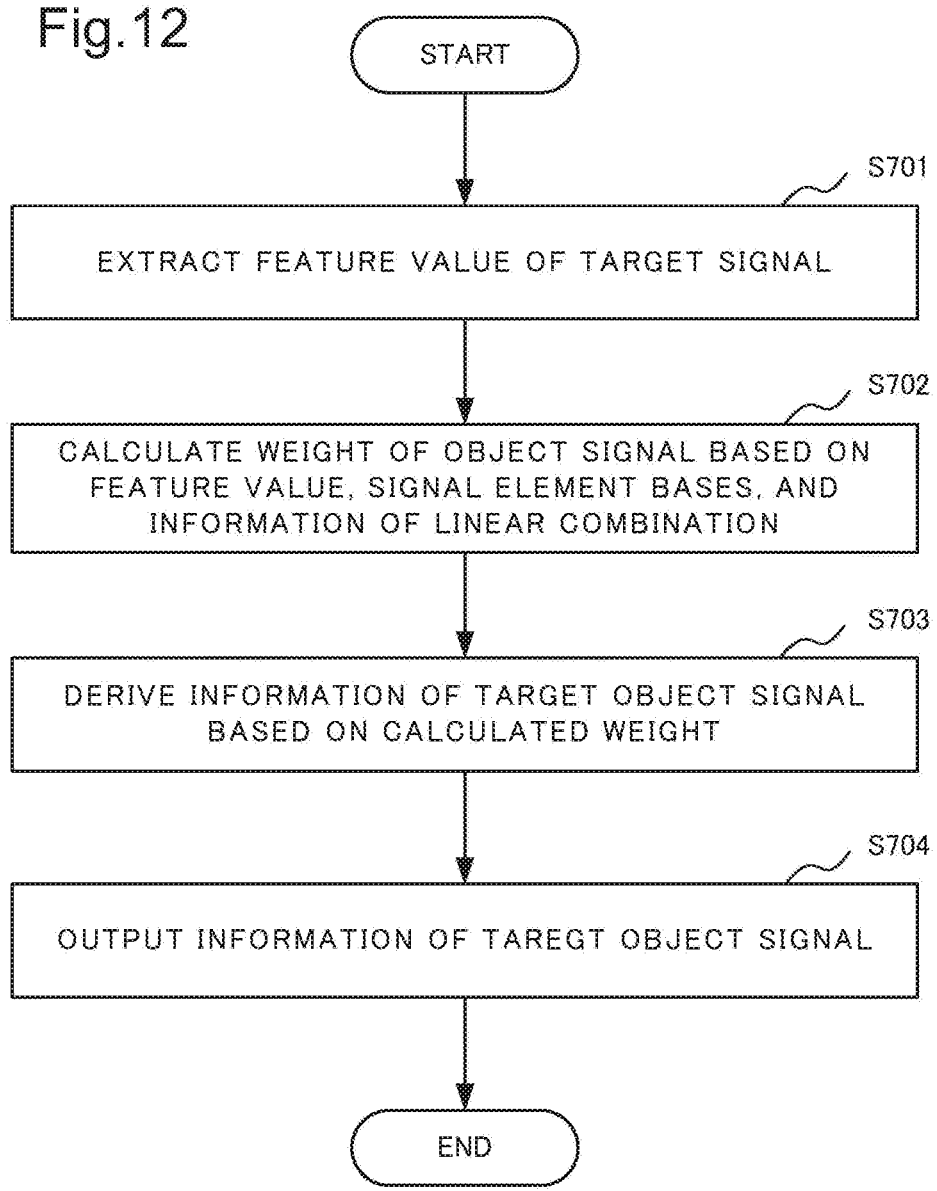
FIG. 12 is a flowchart illustrating one example of an operation of the signal processing device according to the seventh example embodiment of the present invention.

FIG. 12 is a flowchart illustrating an example of an operation of the signal processing device 700 according to the present example embodiment. In FIG. 12, the feature extraction unit 101 extracts a feature value of a target signal (step S701). Next, the analysis unit 103 calculates, based on the extracted feature value, signal element bases, and information of linear combination of signal element bases, a weight representing an intensity of an object signal in the target signal (step S702). In step S702, the analysis unit 103 may calculate a weight, similarly to the analysis unit 103 according to the first, the second, the third, the fourth, the fifth, and the sixth example embodiment. The processing unit 704 derives, based on the calculated weight, information of a target object signal (step S703). In step S703, the processing unit 704 may operate similarly to the combination unit 104 according to the first, the third, and the fifth example embodiment, and derive, as information of a target object signal, a separated signal of a component of a target object signal. In step S703, the processing unit 703 may operate similarly to the detection unit 204 according to the second, the fourth, and the fifth example embodiment, and derive, as information of a target object signal, information indicating whether a target object signal is included in a target signal. The output unit 106 outputs the derived information of the target object signal (step S704).

Advantageous Effect

The present example embodiment has an advantageous effect that even when a variation of object signals is large, information of a component of an modeled object signal can be acquired at a low memory cost. The reason is that a weight of an object signal is calculated based on an extracted feature value, signal element bases by which a plurality of types of object signals are described using linear combination, and information of the linear combination. The processing unit 704 derives, based on the weight, information of a target object signal. A memory cost is reduced in comparison with the related art by using signal element bases by which a plurality of types of object signals are described using linear combination.

Another Example Embodiment

While the present invention has been described with reference to example embodiments, the present invention is not limited to these example embodiments.

In the above description, a signal is an acoustic signal, but a signal is not limited to an acoustic signal. A signal may be a time-series temperature signal acquired from a temperature sensor. A signal may be a vibration signal acquired from a vibration sensor. A signal may be time-series data of a power consumption. A signal may be series data of a power consumption for each power user. A signal may be time-series data of a traffic density in a network. A signal may be time-series data of an air flow. A signal may be space-series data of an amount of precipitation in a certain range. A signal may be other angle series data of an angle or discrete series data such as a text.

Series data are not limited to series data of an equal interval. Series data may be series data of an unequal interval.

In the above description, a method of decomposing a matrix is non-negative matrix factorization, but a method of decomposing a matrix is not limited to non-negative matrix factorization. As the method of decomposing a matrix, a method of decomposing a matrix such as ICA, PCA, and SVD is applicable. A signal may not necessarily be transformed into a form of a matrix. In this case, a signal compression method such as orthogonal matching pursuit, and sparse coding is usable as a method of decomposing a signal.

A device according to the example embodiments of the present invention may be achieved by a system including a plurality of devices. A device according to the example embodiments of the present invention may be achieved by a single device. An information processing program that achieves a function of a device according to the example embodiments of the present invention may be supplied directly or remotely to a computer included in a system or a computer that is the above-described single device. A program that is installed in a computer and achieves, by using the computer, a function of a device according to the example embodiments of the present invention, a medium storing the program, and a world wide web (WWW) server from which the program is downloaded are also included in the example embodiments of the present invention. In particular, at least a non-transitory computer readable medium storing a program that causes a computer to execute processing included in the example embodiments described above is included in the example embodiments of the present invention.

Each of the image generation devices according to the example embodiments of the present invention can be achieved by a computer including a memory in which a program is loaded and a processor that executes the program, dedicated hardware such as a circuit, and a combination of the above-described computer and dedicated hardware.

Figure 13:
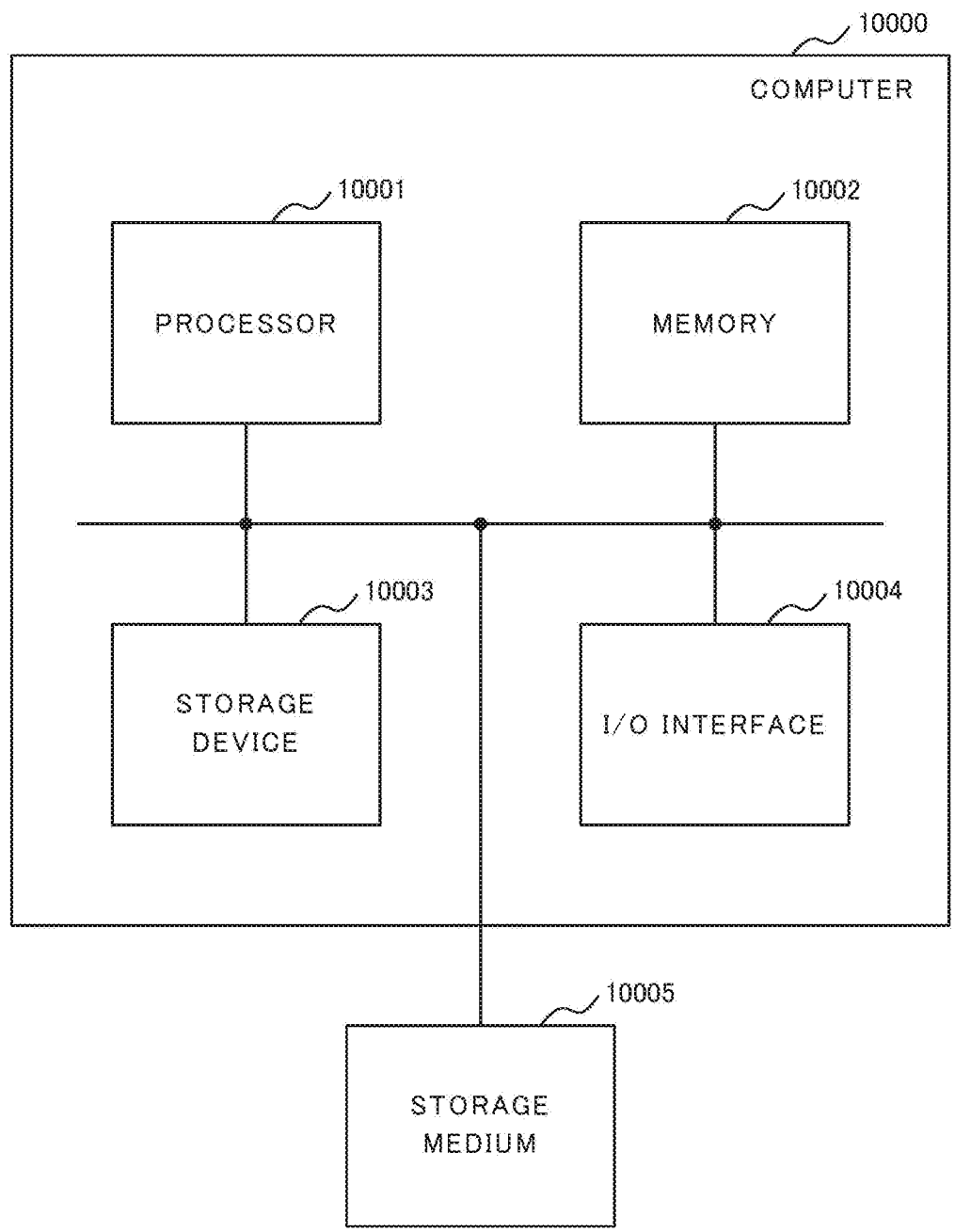
FIG. 13 is a block diagram illustrating an example of a hardware configuration of a computer capable of achieving a signal processing device according to example embodiments of the present invention.

FIG. 13 is a block diagram illustrating an example of a hardware configuration of a computer capable of achieving a signal processing device according to an example embodiment of the present invention. The signal processing device may be, for example, the signal separation device 100 according to the first example embodiment. The signal processing device may be, for example, the signal detection device 200 according to the second example embodiment. The signal processing device may be, for example, the signal separation device 300 according to the third example embodiment. The signal processing device may be, for example, the signal detection device 400 according to the fourth example embodiment. The signal processing device may be, for example, the signal separation device 500 according to the fifth example embodiment. The signal processing device may be, for example, the signal detection device 600 according to the sixth example embodiment. The signal processing device may be, for example, the signal processing device 700 according to the seventh example embodiment. In the following description, a signal separation device, a signal detection device, and a signal processing device are collectively referred to as a signal processing device.

A computer 10000 illustrated in FIG. 13 includes a processor 10001, a memory 10002, a storage device 10003, and an input/output (I/O) interface 10004. The computer 10000 can access a storage medium 10005. The memory 10002 and the storage device 10003 are, for example, a random access memory (RAM) and a storage device such as a hard disk. The storage medium 10005 is, for example, a RAM, a storage device such as a hard disk, a read only memory (ROM), or a portable storage medium. The storage device 10003 may be the storage medium 10005. The processor 10001 can read/write data and a program from/to the memory 10002 and the storage device 10003. The processor 10001 can access, for example, a device that is an output destination of information of a target object signal via the I/O interface 10004. The processor 10001 can access the storage medium 10005. The storage medium 10005 stores a program that causes the computer 10000 to operate as a signal processing device according to any one of the example embodiments of the present invention.

The processor 10001 loads, into the memory 10002, a program that is stored in the storage medium 10005 and causes the computer 10000 to operate as the above-described signal processing device. The processor 10001 executes the program loaded in the memory 10002, so that the computer 10000 operates as the above-described signal processing device.

The feature extraction unit 101, the analysis unit 103, the combination unit 104, the reception unit 105, and the output unit 106 can be achieved by the processor 10001 executing a dedicated program loaded in the memory 10002. The detection unit 204 can be achieved by the processor 10001 executing a dedicated program loaded in the memory 10002. The second feature extraction unit 301, the combination calculation unit 302, and the second reception unit 303 can be achieved by the processor 10001 executing a dedicated program loaded in the memory 10002. The third feature extraction unit 501, the basis extraction unit 502, and the third reception unit 504 can be achieved by the processor 10001 executing a dedicated program loaded in the memory 10002. The processing unit 704 can be achieved by the processor 10001 executing a dedicated program loaded in the memory 10002.

The signal information storage unit 102 and the basis extraction unit 502 can be achieved by the memory 10002 and the storage device 10003 such as a hard disk device included in the computer 10000.

A part or all of the feature extraction unit 101, the signal information storage unit 102, the analysis unit 103, the combination unit 104, the reception unit 105, and the output unit 106 can be achieved by dedicated hardware such as a circuit. The detection unit 204 can be achieved by dedicated hardware such as a circuit. A part or all of the second feature extraction unit 301, the combination calculation unit 302, and the second reception unit 303 can be achieved by dedicated hardware such as a circuit. Some or all of the third feature extraction unit 501, the basis extraction unit 502, the basis storage unit 503, and the third reception unit 504 can be achieved by dedicated hardware such as a circuit. The processing unit 704 can be achieved by dedicated hardware such as a circuit.

A part or all of the example embodiments can be described as the following supplementary notes without being limited thereto.

Supplementary Note 1

A signal processing device including:

feature extraction means for extracting, from a target signal, a feature value representing a feature of the target signal;

analysis means for calculating, based on the extracted feature value, signal element bases capable of representing a plurality of types of object signals by linear combination, and information of the linear combination, weights each representing intensities of the plurality of object signals included in the target signal;

processing means for deriving, based on the weights, information of a target object signal included in the target signal, the target object signal being at least one type of the object signals; and output means for outputting information of the target object signal.

Supplementary Note 2

The signal processing device according to Supplementary Note 1, wherein the processing means derives, based on the signal element bases, information of the linear combination, and the weights, a separated signal as information of the target object signal, the separated signal representing a component of the target object signal included in the target signal.

Supplementary Note 3

The signal processing device according to Supplementary Note 1, wherein the processing means derives, based on the weights, information of the target object signal, the information indicating whether the target object signal is included in the target signal.

Supplementary Note 4

The signal processing device according to any one of Supplementary Notes 1 to 3, further including
combination calculation means for calculating, based on an object-signal-learning feature value and second weights, information of the linear combination, the object-signal-learning feature value being a feature value extracted from an object-signal-learning signal including the plurality of types of object signals, the second weights each representing intensities of the plurality of types of object signals in the object-signal-learning signal.

Supplementary Note 5

The signal processing device according to Supplementary Note 4, wherein
the object-signal-learning signal calculates, based on the object-signal-learning feature value, the signal element bases.

Supplementary Note 6

The signal processing device according to Supplementary Note 4, further including
basis extraction means for extracting, based on a feature value extracted from a basis-learning signal, the signal element bases, the basis-learning signal including the plurality of types of object signals, wherein
the combination calculation means calculates, based on the object-signal-learning feature value, the second weights, and the extracted signal element bases, the information of the linear combination.

Supplementary Note 7

A signal processing method including:
extracting, from a target signal, a feature value representing a feature of the target signal;
calculating, based on the extracted feature value, signal element bases capable of representing a plurality of types of object signals by linear combination, and information of the linear combination, weights each representing intensities of the plurality of object signals included in the target signal;
deriving, based on the weights, information of a target object signal included in the target signal, the target object signal being at least one type of the object signals; and
outputting information of the target object signal.

Supplementary Note 8

The signal processing method according to Supplementary Note 7, wherein
the deriving includes deriving, based on the signal element bases, information of the linear combination, and the weights, a separated signal as information of the target object signal, the separated signal representing a component of the target object signal included in the target signal.

Supplementary Note 9

The signal processing method according to Supplementary Note 7, wherein
the deriving includes deriving, based on the weights, information of the target object signal, the information indicating whether the target object signal is included in the target signal.

Supplementary Note 10

The signal processing method according to any one of Supplementary Notes 7 to 9, further including
calculating, based on an object-signal-learning feature value and second weights, information of the linear combination, the object-signal-learning feature value being a feature value extracted from an object-signal-learning signal including the plurality of types of object signals, the second weights each representing intensities of the plurality of types of object signals in the object-signal-learning signal.

Supplementary Note 11

The signal processing method according to Supplementary Note 10, wherein
the object-signal-learning signal calculates, based on the object-signal-learning feature value, the signal element bases.

Supplementary Note 12

The signal processing method according to Supplementary Note 10, further including
extracting, based on a feature value extracted from a basis-learning signal, the signal element bases, the basis-learning signal including the plurality of types of object signals, wherein
the calculating the information of the linear combination includes calculating, based on the object-signal-learning feature value, the second weights, and the extracted signal element bases, the information of the linear combination.

Supplementary Note 13

A storage medium storing a program causing a computer to execute:
feature extraction processing of extracting, from a target signal, a feature value representing a feature of the target signal;
analysis processing of calculating, based on the extracted feature value, signal element bases capable of representing a plurality of types of object signals by linear combination, and information of the linear combination, weights each representing intensities of the plurality of object signals included in the target signal;
derivation processing of deriving, based on the weights, information of a target object signal included in the target signal, the target object signal being at least one type of the object signals; and
output processing of outputting information of the target object signal.

Supplementary Note 14

The storage medium according to Supplementary Note 13, wherein
the derivation processing derives, based on the signal element bases, information of the linear combination, and the weights, a separated signal as information of the target object signal, the separated signal representing a component of the target object signal included in the target signal.

Supplementary Note 15

The storage medium according to Supplementary Note 13, wherein
the derivation processing derives, based on the weights, information of the target object signal, the information indicating whether the target object signal is included in the target signal.

Supplementary Note 16

The storage medium according to any one of Supplementary Notes 13 to 15, the program further causing a computer to execute
combination calculation processing of calculating, based on an object-signal-learning feature value and second weights, information of the linear combination, the object-signal-learning feature value being a feature value extracted from an object-signal-learning signal including the plurality of types of object signals, the second weights each representing intensities of the plurality of types of object signals in the object-signal-learning signal.

Supplementary Note 17

The storage medium according to Supplementary Note 16, wherein
the object-signal-learning signal calculates, based on the object-signal-learning feature value, the signal element bases.

Supplementary Note 18

The storage medium according to Supplementary Note 16, the program further causing a computer to execute
basis extraction processing of extracting, based on a feature value extracted from a basis-learning signal, the signal element bases, the basis-learning signal including the plurality of types of object signals, wherein
the combination calculation processing calculates, based on the object-signal-learning feature value, the second weights, and the extracted signal element bases, the information of the linear combination.

While the present invention has been described with reference to the example embodiments, the present invention is not limited to the example embodiments described above. The configuration and details of the present invention can be subjected to various modifications which can be understood by those of ordinary skill in the art without departing from the scope of the present invention. A system or a device in which individual features included in example embodiments are combined is also included in the scope of the present invention, regardless of a combination manner.

REFERENCE SIGNS LIST

100 Signal separation device
101 Feature extraction unit
102 Signal information storage unit
103 Analysis unit
104 Combination unit
105 Reception unit
106 Output unit
200 Signal detection device
204 Detection unit
300 Signal separation device
301 Second feature extraction unit
302 Combination calculation unit
303 Second reception unit
400 Signal detection device
500 Signal separation device
501 Third feature extraction unit
502 Basis extraction unit
503 Basis storage unit
504 Third reception unit
600 Signal detection device
700 Signal processing device
704 Processing unit
900 Signal separation device
901 Feature extraction unit
902 Basis storage unit
903 Analysis unit
904 Combination unit
905 Reception unit
906 Output unit
10000 Computer
10001 Processor
10002 Memory
10003 Storage device
10004 I/O interface
10005 Storage medium

What is claimed is:

1. A signal processing device comprising:
at least one memory storing a set of instructions; and
at least one processor configured to execute the set of instructions to:
extract a feature value from a target acoustic signal acquired by a sensor;
calculate weights based on the extracted feature value, acoustic signal element bases and information of a linear combination, the acoustic signal element bases being a linearly independent partial set and capable of representing a plurality of types of acoustic object signals by the linear combination, the plurality of types of acoustic object signals being generated by a specific acoustic signal source, and the weights each representing intensities of the plurality of types of acoustic object signals included in the target acoustic signal;
derive, based on the weights, information of a target acoustic object signal included in the target acoustic signal, the target acoustic object signal being at least one type of the plurality of types of acoustic object signals; and
output information of the target acoustic object signal.

2. The signal processing device according to claim 1, wherein
the at least one processor is further configured to execute the instructions to
derive, based on the acoustic signal element bases, information of the linear combination, and the weights, a separated signal as information of the target acoustic object signal, the separated signal representing a component of the target acoustic object signal included in the target acoustic signal.

3. The signal processing device according to claim 1, wherein
the at least one processor is further configured to execute the instructions to
derive, based on the weights, information of the target acoustic object signal, the information indicating whether the target acoustic object signal is included in the target acoustic signal.

4. The signal processing device according to claim 1, wherein
the at least one processor is further configured to execute the instructions to
calculate, based on an object-signal-learning feature value and second weights, information of the linear combination, the object-signal-learning feature value being a feature value extracted from an object-signal-learning signal including the plurality of types of acoustic object signals, the second weights each representing intensities of the plurality of types of acoustic object signals in the object-signal-learning signal.

5. The signal processing device according to claim 4, wherein
the at least one processor is further configured to execute the instructions to
calculate, based on the object-signal-learning feature value, the acoustic signal element bases.

6. The signal processing device according to claim 4, wherein
the at least one processor is further configured to execute the instructions to
extract, based on a feature value extracted from a basis-learning signal, the acoustic signal element bases, the basis-learning signal including the plurality of types of acoustic object signals, wherein
calculate, based on the object-signal-learning feature value, the second weights, and the extracted acoustic signal element bases, the information of the linear combination.

7. A signal processing method comprising:
extracting a feature value from a target acoustic signal acquired by a sensor;
calculating weights based on the extracted feature value, acoustic signal element bases and information of a linear combination, the acoustic signal element bases being a linearly independent partial set and capable of representing a plurality of types of acoustic object signals by the linear combination, the plurality of types of acoustic object signals being generated by a specific acoustic signal source, and the weights each representing intensities of the plurality of types of acoustic object signals included in the target acoustic signal;
deriving, based on the weights, information of a target acoustic object signal included in the target acoustic signal, the target acoustic object signal being at least one type of the plurality of types of acoustic object signals; and
outputting information of the target acoustic object signal.

8. The signal processing method according to claim 7, wherein
the deriving includes deriving, based on the acoustic signal element bases, information of the linear combination, and the weights, a separated signal as information of the target acoustic object signal, the separated signal representing a component of the target acoustic object signal included in the target acoustic signal.

9. The signal processing method according to claim 7, wherein
the deriving includes deriving, based on the weights, information of the target acoustic object signal, the information indicating whether the target acoustic object signal is included in the target acoustic signal.

10. The signal processing method according to claim 7, further comprising
calculating, based on an object-signal-learning feature value and second weights, information of the linear combination, the object-signal-learning feature value being a feature value extracted from an object-signal-learning signal including the plurality of types of acoustic object signals, the second weights each representing intensities of the plurality of types of acoustic object signals in the object-signal-learning signal.

11. The signal processing method according to claim 10, wherein
the calculating the information of the linear combination includes calculating, based on the object-signal-learning feature value, the acoustic signal element bases.

12. The signal processing method according to claim 10, further comprising
extracting, based on a feature value extracted from a basis-learning signal, the acoustic signal element bases, the basis-learning signal including the plurality of types of acoustic object signals, wherein
the calculating the information of the linear combination includes calculating, based on the object-signal-learning feature value, the second weights, and the extracted acoustic signal element bases, the information of the linear combination.

13. A non-transitory computer readable storage medium storing a program causing a computer to execute:
feature extraction processing of extracting a feature value from a target acoustic signal acquired by a sensor;
analysis processing of calculating weights based on the extracted feature value, acoustic signal element bases and information of a linear combination, the acoustic signal element bases being a linearly independent partial set and capable of representing a plurality of types of acoustic object signals by the linear combination, the plurality of types of acoustic object signals being generated by a specific acoustic signal source, and the weights each representing intensities of the plurality of types of acoustic object signals included in the target acoustic signal;
derivation processing of deriving, based on the weights, information of a target acoustic object signal included in the target acoustic signal, the target acoustic object signal being at least one type of the plurality of types of acoustic object signals; and
output processing of outputting information of the target object signal.

14. The storage medium according to claim 13, wherein
the derivation processing derives, based on the acoustic signal element bases, information of the linear combination, and the weights, a separated signal as information of the target acoustic object signal, the separated signal representing a component of the target acoustic object signal included in the target acoustic signal.

15. The storage medium according to claim 13, wherein
the derivation processing derives, based on the weights, information of the target acoustic object signal, the information indicating whether the target acoustic object signal is included in the target acoustic signal.

16. The storage medium according to claim 13, the program further causing a computer to execute
combination calculation processing of calculating, based on an object-signal-learning feature value and second weights, information of the linear combination, the object-signal-learning feature value being a feature value extracted from an object-signal-learning signal including the plurality of types of acoustic object signals, the second weights each representing intensities of the plurality of types of acoustic object signals in the object-signal-learning signal.

17. The storage medium according to claim 16, wherein
the combination calculation processing calculates, based
on the object-signal-learning feature value, the acoustic
signal element bases.

18. The storage medium according to claim 16, the
program further causing a computer to execute
basis extraction processing of extracting, based on a
feature value extracted from a basis-learning signal, the
acoustic signal element bases, the basis-learning signal
including the plurality of types of acoustic object
signals, wherein
the combination calculation processing calculates, based
on the object-signal-learning feature value, the second
weights, and the extracted acoustic signal element
bases, the information of the linear combination.

\* \* \* \* \*